United States Patent
Nomura et al.

(10) Patent No.: US 7,191,028 B2
(45) Date of Patent: **\*Mar. 13, 2007**

(54) ELECTRICALLY CONTROLLED APPARATUS

(75) Inventors: Tatsuo Nomura, Soraku-gun (JP); Syouichirou Yoshiura, Ikoma-gun (JP); Tsutomu Yoshimoto, Yamatotakada (JP)

(73) Assignee: Sharp Kabushiki Kaisha, Osaka (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 11/259,077

(22) Filed: Oct. 27, 2005

(65) Prior Publication Data

US 2006/0036340 A1 Feb. 16, 2006

Related U.S. Application Data

(62) Division of application No. 10/310,039, filed on Dec. 5, 2002, now Pat. No. 6,990,381.

(30) Foreign Application Priority Data

Dec. 27, 2001 (JP) ............................. 2001-398189

(51) Int. Cl.
*G06F 19/00* (2006.01)
*G06F 3/00* (2006.01)
*G06F 17/00* (2006.01)
*G06T 11/20* (2006.01)
*G05B 15/00* (2006.01)

(52) U.S. Cl. .................. 700/100; 700/17; 700/83; 345/440; 345/440.1; 345/440.2; 345/441; 345/442; 345/443; 710/1; 710/6; 710/15; 710/16; 710/17; 710/18; 710/19; 715/700; 715/716; 715/719; 715/762; 715/763; 715/961; 715/963; 715/966; 715/967; 715/969; 715/974

(58) Field of Classification Search ................ 345/440, 345/440.1, 440.2, 441, 442, 443; 700/17, 700/83, 99, 100, 102, 108; 710/1, 5, 6, 15–19, 710/62, 72, 73; 715/700, 716, 719, 762, 715/763, 961, 963, 965–967, 969, 974
See application file for complete search history.

(56) References Cited

U.S. PATENT DOCUMENTS 5,282,127 A 1/1994 Mii (Continued)

FOREIGN PATENT DOCUMENTS

CN 1 220 422 6/1999

(Continued)

*Primary Examiner*—Tanh Q. Nguyen
(74) *Attorney, Agent, or Firm*—Nixon & Vanderhye P.C.

(57) ABSTRACT

An electronically controlled apparatus of the present invention includes: an input-output section, which electronically processes and outputs input data; a control section, which electronically controls the input-output section according to operating status data of each component of the input-output section; a managing section, which monitors the operating status data of each component of the input-output section, so as to store and manage the operating status data with corresponding time information of the operating status data; and a processing section, which creates graphic display of the operating status data in a given time scale according to the operating status data and the time information. With the electronically controlled apparatus, it becomes easier to manage regular inspections and replenishing expendables, without lowering an activity rate.

3 Claims, 25 Drawing Sheets

U.S. PATENT DOCUMENTS

| | | |
|---|---|---|
| 5,305,199 A | 4/1994 | LoBiondo et al. |
| 5,727,135 A | 3/1998 | Webb et al. |
| 5,844,572 A | 12/1998 | Schott |
| 5,913,090 A | 6/1999 | Sawada et al. |
| 5,961,613 A | 10/1999 | DeNicola |
| 6,058,277 A | 5/2000 | Streefkerk et al. |
| 6,310,692 B1 | 10/2001 | Fan et al. |
| 6,367,992 B1 | 4/2002 | Aruga et al. |
| 6,389,248 B1 | 5/2002 | Konno et al. |
| 6,604,212 B2 | 8/2003 | Sekizawa |
| 6,709,176 B2 | 3/2004 | Gotoh et al. |
| 2002/0186406 A1 | 12/2002 | Phillips et al. |

FOREIGN PATENT DOCUMENTS

| | | |
|---|---|---|
| CN | 1 287 289 | 3/2001 |
| JP | 60-222938 A | 11/1985 |
| JP | 3-277580 A | 12/1991 |
| JP | 4-180072 A | 6/1992 |
| JP | 7-321985 A | 12/1995 |
| JP | 11-134142 A | 5/1999 |
| JP | 11-227299 A | 8/1999 |

FIG.4

OPERATING STATUS MONITORED DATA LIST OF PRINTER APPARATUS 1    22

| YEAR | MONTH | DATE | DAY | TIMES | MODE | SHEET SIZE | SHEET QUANTITY |
|---|---|---|---|---|---|---|---|
| 2001 | 10 | 1 | MONDAY | 8:53 | COPY | A4 | 21 |
| 2001 | 10 | 1 | MONDAY | 9:20 | COPY | A4 | 5 |
| 2001 | 10 | 1 | MONDAY | 9:33 | PRINT | A4 | 10 |
| 2001 | 10 | 1 | MONDAY | 9:40 | FAX RECEPTION | A4 | 3 |
| 2001 | 10 | 1 | MONDAY | 9:45 | FAX RECEPTION | A3 | 2 |
| 2001 | 10 | 1 | MONDAY | 9:51 | PRINT | A4 | 15 |
| 2001 | 10 | 1 | MONDAY | 10:06 | FAX RECEPTION | A4 | 9 |
| 2001 | 10 | 1 | MONDAY | 10:12 | COPY | B5 | 5 |
| 2001 | 10 | 1 | MONDAY | 10:25 | COPY | B5 | 10 |
| 2001 | 10 | 1 | MONDAY | 10:43 | PRINT | A3 | 1 |
| 2001 | 10 | 1 | MONDAY | 10:55 | PRINT | A4 | 8 |
| 2001 | 10 | 2 | TUESDAY | 8:35 | PRINT | A4 | 5 |
| 2001 | 10 | 2 | TUESDAY | 9:10 | PRINT | B4 | 4 |
| 2001 | 10 | 2 | TUESDAY | 9:18 | PRINT | A4 | 26 |
| 2001 | 10 | 2 | TUESDAY | 9:46 | FAX RECEPTION | A4 | 11 |
| 2001 | 10 | 2 | TUESDAY | 9:57 | COPY | B5 | 10 |

ELECTRICALLY CONTROLLED APPARATUS

This application is a Divisional of application Ser. No. 10/310,039, filed Dec. 5, 2002 (now U.S. Pat. No. 6,990,381), the entire content of which is hereby incorporated herein by reference in this application.

FIELD OF THE INVENTION

The present invention relates to an electronically controlled apparatus that monitors an operating status of each apparatus component so as to display an operating status of the apparatus, as required, in the form of graphic display (level display) that is highly recognizable and allows the electronically controlled apparatus to be easily managed.

BACKGROUND OF THE INVENTION

In today's network environment, an electrically controlled apparatus connected to a network is often shared by multiple users. An example of such an electrically controlled apparatus is a printer connected to a network. Such a printer operates to receive a series of jobs that were requested for output by multiple clients and the printer prints out the jobs in the order they were received. This is a convenient way of automatically making prints of requested jobs.

In the last years, there has been commercialized a complex system that provides a scanner (copier), a facsimile, and a printer in integrated form as a printer apparatus complex. The printer apparatus complex operates such that the printer successively outputs image data that was entered in each mode of the apparatus, such as a scan mode.

However, the electronically controlled apparatus that is shared by multiple users, or that with a plurality of modes (plural paths of image entry) is associated with a problem. Namely, it may take time to process a requested new job when the activity rate of the electronically controlled apparatus is high and the apparatus is operating at its peak with a plurality of jobs.

Further, operations of the electronically controlled apparatus need to be arrested when supplying expendables or replacing and adjusting (inspecting) components, which needs to be performed regularly to maintain a stable environment for the electronically controlled apparatus. Arresting operations of the electronically controlled apparatus, however, is inconvenient for the users and management of the apparatus should ideally be carried out to cause as few problems as possible for the users.

A recently proposed electronically controlled apparatus is provided with a monitoring system that enables the administrator or other users to grasp the operating status of the apparatus. This is achieved by the functions of the electronically controlled apparatus, whereby the operating history of the apparatus, managed and stored, is displayed in the form of a list or printed out, so that the administrators or users can see the history of operating status of the apparatus.

Such a monitoring system, however, poses a great difficulty both for the common users and the administrator to know the operating status because the system only displays a list. This is troublesome for the user of the apparatus when the regular inspection needs to be carried out at the time when the activity rate (operating status) of the electronically controlled apparatus is high.

SUMMARY OF THE INVENTION

Accordingly, it is an object of the present invention to provide an electronically controlled apparatus that has a function of managing an operating status of the apparatus and displaying, based on the managed data, the operating status of the apparatus in the form of graphic display with a time axis, so as to enable users to request a new job or make reservations by referring to the graphically displayed operating status of the apparatus.

In order to achieve this object, an electronically controlled apparatus of the present invention includes: an input-output section, which electronically processes and outputs input data; a control section, which electronically controls the input-output section according to operating status data of each component of the input-output section; a managing section, which monitors the operating status data of each component of the input-output section, so as to store and manage the operating status data with corresponding time information of the operating status data; and a processing section, which creates graphic display of the operating status data in a given time scale according to the operating status data and the time information.

According to this configuration, by the provision of the processing section that creates graphic display of the operating status of each component, the operating status of each component can be graphically displayed. This enables a user to visually confirm a load on each component and its surrounding environment, allowing the user to give new instructions or consider other options based on the graphically displayed operating status.

The foregoing configuration is also advantageous for the administrators. Namely, it makes it easier for the administrators to perform daily management, such as replenishing of expendables such as paper or a developer, so as to prevent operations of each component from being arrested.

In order to achieve the foregoing object, another electronically controlled apparatus of the present invention includes: a plurality of processing units, each including an input-output section, which electronically processes and outputs input data; and a control section, which electronically controls the input-output section according to operating status data of each component of the input-output section; a managing section, which monitors the operating status data of each component of each processing unit, so as to store and manage the operating status data with corresponding time information of the operating status data; and a processing section, which creates graphic display of the operating status data in a given time scale according to the operating status data and the time information.

According to this configuration, the operating status of the apparatus complex is graphically displayed for each processing unit (scanner unit, printer unit, fax unit, etc.). This enables a user to visually confirm a load on each processing unit and its surrounding environment.

Thus, the foregoing configuration allows the user to more accurately give new instructions or consider other options based on the graphically displayed operating status of each processing unit. The foregoing configuration is also advantageous for the administrators. Namely, it makes it easier for the administrators to perform daily management, such as replenishing of expendables such as paper or a developer, so as to prevent operations of each component of each processing unit from being arrested.

In order to achieve the foregoing object, yet another electronically controlled apparatus of the present invention is provided with a plurality of processing modes for data processing, the processing modes being provided for an input-output section that electronically processes and outputs input data, and the electronically controlled apparatus includes: a managing section, which monitors operating status data of the processing modes, so as to store and manage the operating status data with corresponding time information of the operating status data; and a processing section, which creates (processes) graphic display of the operating status data in a given time scale for each processing mode according to the operating status data and the time information.

According to this configuration, the operating status of each of the processing modes of the apparatus complex is graphically displayed. This enables a user to visually confirm a load on each processing mode and its surrounding environment, allowing the user to give new instructions or consider other options based on the graphically displayed operating status of each processing mode. The foregoing configuration is also advantageous for the administrators. Namely, it makes it easier for the administrators to perform daily management, such as replenishing of expendables such as paper or a developer, so as to prevent operations of each component of each processing mode from being arrested.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a table showing a managing table of the electronically controlled apparatus.

DESCRIPTION OF THE EMBODIMENTS

First Embodiment

One embodiment of the present invention is described below with reference to FIG. 1 through FIG. 25.

Figure 2:
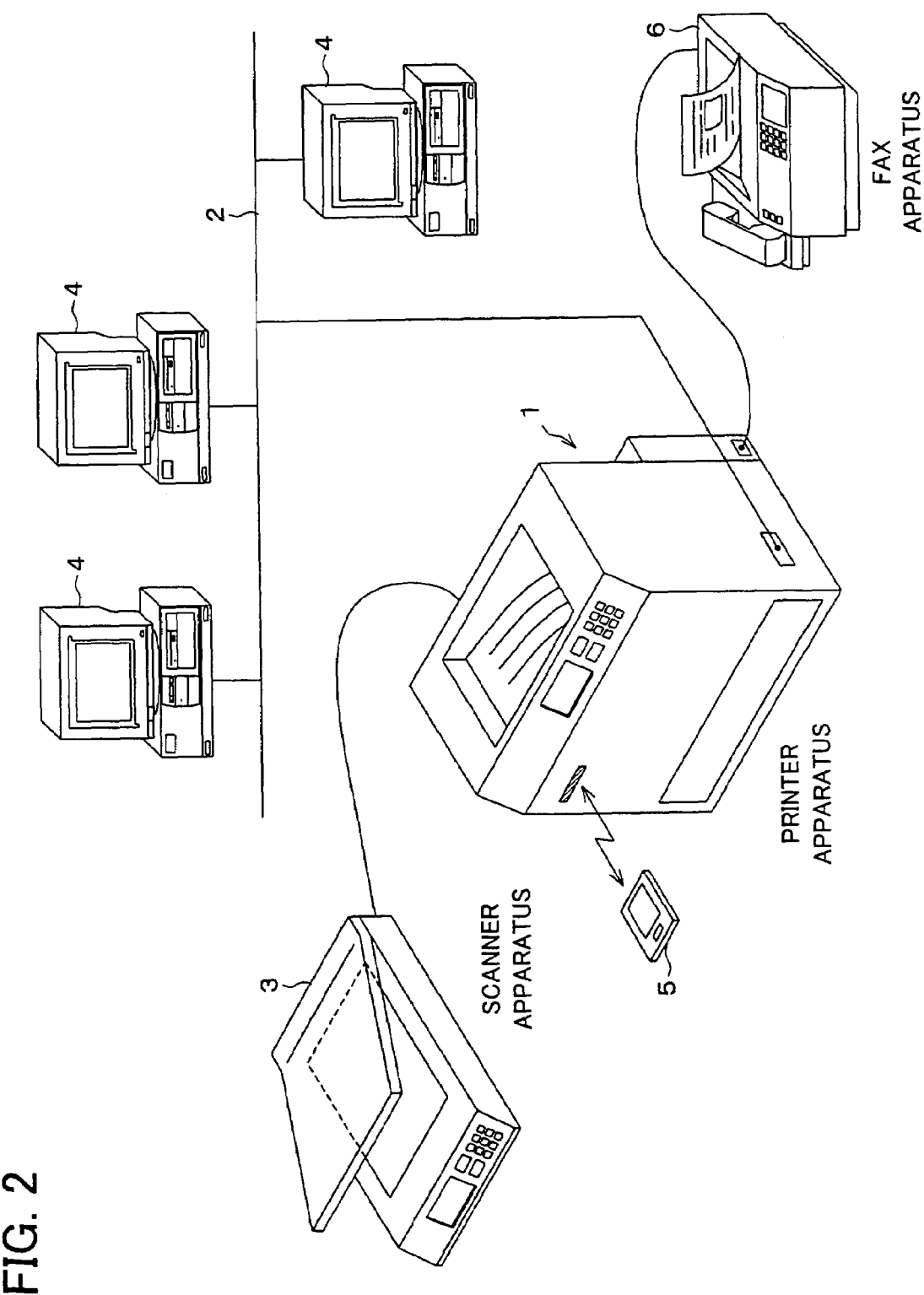
FIG. 2 is a perspective view showing the entire system structure.

One application of a managing system of an electronically controlled apparatus according to the present invention is shown, for example, in FIG. 2. In this example, a printer apparatus 1 connected to a network is provided as the electronically controlled apparatus.

The printer apparatus 1, which is the core of the present managing system, is connected, at all times or upon request, to various types of electrical apparatuses or devices, such as a scanner apparatus (processing unit) 3, a personal computer 4, a PDA terminal 5, and an externally provided facsimile (FAX, processing unit) apparatus 6, via communication paths 2 such as a network. The printer apparatus 1 is able to successively make prints of image data that are transmitted from these electrical apparatuses or devices.

The managing system of the present invention, working in this environment, monitors operating statuses of various components of the printer apparatus 1, so as to manage and store the monitored information as operating status information. Upon request for confirmation of the operating status, the managing system refers to the managed operating status information and indicates an operating rate (activity rate) of each component of the printer apparatus 1 in easily recognizable form, for example, in the form of graphic display.

Figure 1:
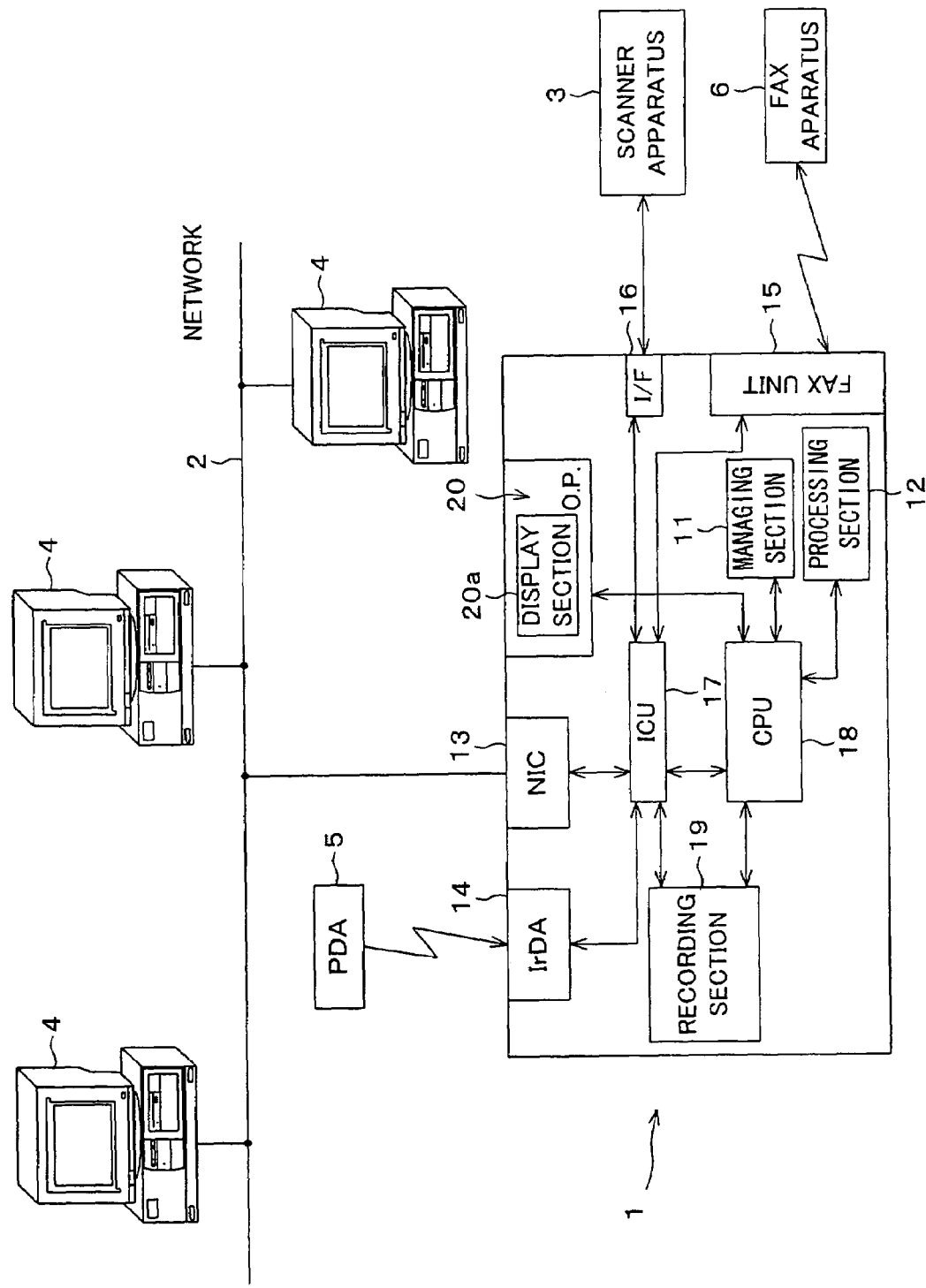
FIG. 1 is a block diagram showing a relevant portion of an electronically controlled apparatus according to the present invention and of an entire system structure with the electronically controlled apparatus connected to a network.

The printer apparatus 1 includes, as shown in FIG. 1, a managing section 11 and a processing section 12, and is connected to the foregoing electrical apparatuses and devices, which are peripheral devices connectable to the printer apparatus 1, via the communication paths 2 such as a network. The managing section 11 is provided to manage an operating status of each component of the printer apparatus 1. The processing section 12 is provided to process the operating status into graphics based on information of the operating status managed by the managing section 11.

The printer apparatus 1 is provided with various types of interfaces, such as a network interface card (NIC, input-output section, communicating section) 13, which enables the printer apparatus 1 to communicate with or connect to the electrical apparatus or device such as the personal computer 4 on the network.

The printer apparatus 1 is also provided with a radio communication interface ("IrDA" in FIG. 1, input-output section, communicating section) 14, such as IrDA or Bluetooth (registered trademark), through which the printer apparatus 1 is temporarily connected, as required, to the electrical apparatus or device, so as to enable the printer apparatus 1 to output an image based on the image data from the electrical apparatus or device.

In addition, the printer apparatus 1 is able to establish bi-directional communications (send/receive images) with the externally provided FAX apparatus 6 via a FAX unit (input-output section, communicating section) 15. The printer apparatus 1, via an I/F (input-output section) 16, is also able to receive image data of a document that was turned into data in the scanner apparatus 3. Further, the printer apparatus 1 may print (input-output) the image data in a copy mode.

The image data from the external electrical apparatus or device and through the interfaces 13, 14, 15, and 16 is subjected to image processing in an ICU (image data processing section) 17. A recording section (input-output section) 19 carries out the operation of recording (e.g., printing) based on the image data.

The printer apparatus 1 further includes a CPU (control section, setting section) 18. The CPU 18 controls each component of the printer apparatus 1 according to pre-defined programs. In particular, the CPU 18 delicately controls each image forming process of the recording section 19, so as to enable image recording based on the image data sent from the ICU 17.

The CPU 18 also manages an operator panel ("O.P." in FIG. 1, instructing section) 20 that has a display section 20a whose upper surface makes up a transparent touch panel. The CPU 18 monitors instructions entered via the operator panel 20 by an operator (user, administrator), so as to grasp the content of the entered instructions and control an operation of each component of the printer apparatus 1. In addition, the CPU 18 carries out the operation of notifying (displaying) guidance information concerning the printer apparatus 1 to the operator.

The managing section 11 monitors an operating status of the printer apparatus 1 at all times, so as to obtain operating status information and its corresponding time information. The managing section 11 stores the information in the form of information that relates to an operating status.

One feature of the present invention is that the processing section 12 has a function of graphically displaying the operating status of the printer apparatus 1 (e.g., a graphic in which the horizontal axis indicates time).

The processing section 12 computes an operating status within a predetermined time period of each component of the printer apparatus 1 in percent, where the unit of the time axis (time scale) on the horizontal axis of the graphic display is year, month, day, or second. In this way, the processing section 12 converts information of the operating status into graphic display.

For example, when the time axis has one-hour time intervals, the operating rate is computed based on the total operating time within the time period of one hour. (For example, when the operating time in the one-hour time period is 45 minutes and the remaining 15 minutes is standby, the operating rate is 75%.)

This is repeated for each one-hour time interval to create data for graphic display. The data of operating status of each component managed by the managing section 11 is based on the start time and end time of the job and it is managed per job.

Figure 3:
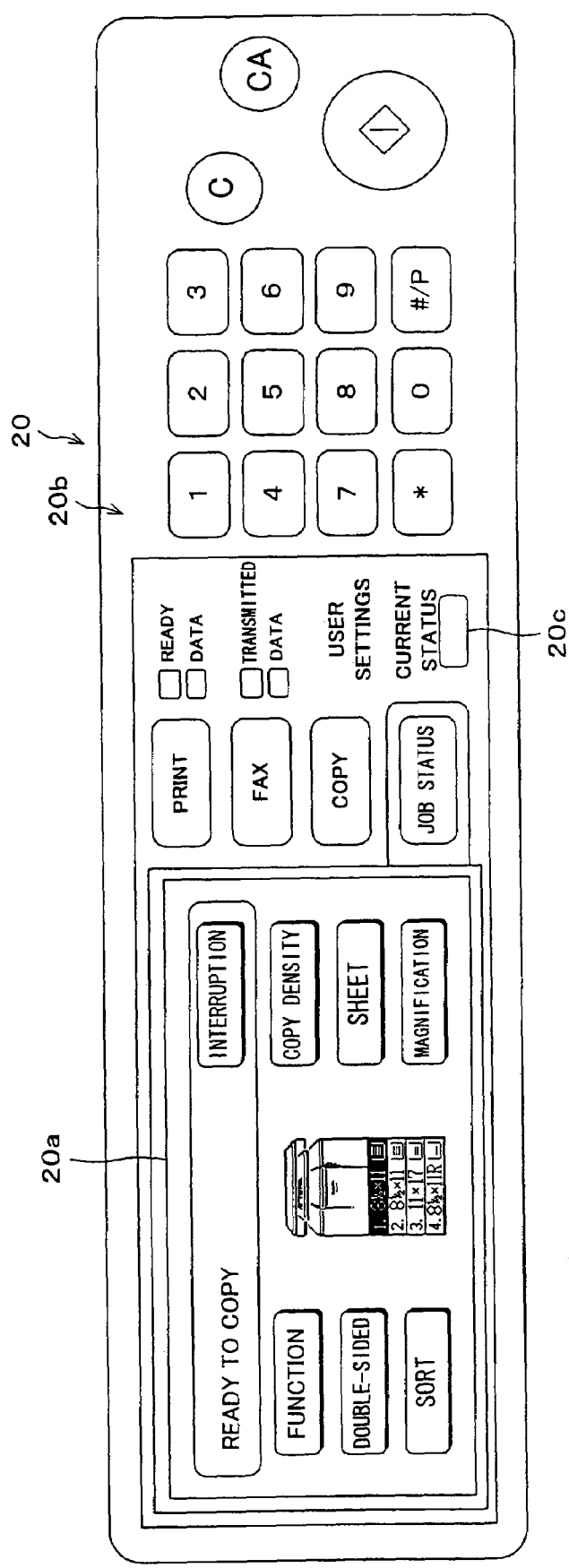
FIG. 3 is a plan view showing an operator panel of the electronically controlled apparatus.

The operator panel 20 of the printer apparatus 1 has the display section 20a and an operating section 20b, as shown in FIG. 3. The display section 20a, for example, is a dot-matrix type liquid crystal display panel, which is provided in the left half of the operator panel 20, for example.

The upper surface of the liquid crystal display panel makes up a transparent (light transmissive) touch panel (tablet). Touching a portion of the touch panel with a finger where the liquid crystal display panel displays a key causes a mode signal to enter the CPU 18, indicating that the key has been operated. The key portion of the liquid crystal panel is displayed in different modes (different colors, different shapes) to indicate that it has been operated. Further, the liquid crystal display panel is designed such that the entire display screen scrolls horizontally and vertically as required.

The other half, e.g., the right half, of the operator panel 20 has various keys, including mode selecting keys (selecting section), a job status key, numeric keys, a clear (C) key, an all clear (AC) key, and a print key. The mode selecting keys are provided to select an operating mode (processing mode) of the printer apparatus between operating modes of a PRINT job, a FAX job, and a COPY job. The job status key is provided to check the progress of the print job. The numeric keys are provided to enter a quantity of prints. The clear (C) key is used to partially clear a mode. The all clear (AC) key is used to completely clear a mode. The print key is used to instruct a start of a print job.

To the right of the job status key is disposed a current status key (instructing section) 20c. One feature of the present invention is that the current status key 20c is used to instruct the printer apparatus 1 to display (graphic display) an operating status of each component of the printer apparatus 1. Thus, operating the current status key 20c creates graphic display of an operating status in the display section 20a of the operator panel 20.

FIG. 4 shows information of a managing table 22 as an example of an operating status monitored data list of the printer apparatus 1 managed by the managing section 11.

Examples of information managed by the managing table 22 includes times, paths (modes) of entry, document size information, image size information, sheet size information, and a quantity of prints, with respect to each job for processing image data that is entered through each interface. The number of managing headings may be increased or decreased as need arises. (For example, a status of a post-processing device with respect to printed sheets may be added.)

Further, the managed data (managing table), which is managed in a memory section (not shown) of the printer apparatus 1 in this example, may alternatively be provided in a separate device from the printer apparatus 1, or in a peripheral device that can communicate with the printer apparatus 1.

Figure 5:
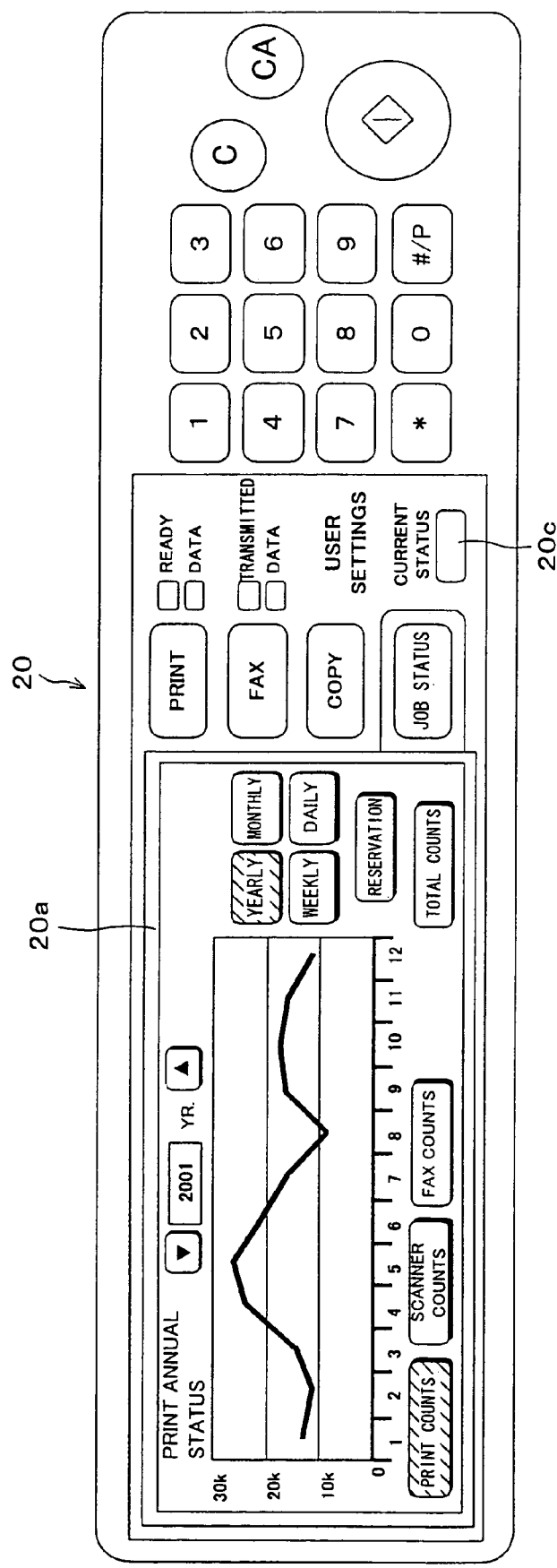
FIG. 5 is a plan view of the operator panel, showing an example of graphic display displaying an annual operating status (print counts) in the operator panel.

FIG. 5 shows an example of graphic display. In this example, the display section 20*a* displays the result of data processing in the processing section 12 of the printer apparatus 1, in which the counted data of each month is processed based on the operating status monitored data to graphically display the data. In this way, the processing section 12 of the printer apparatus 1 displays the operating status of the printer apparatus 1 based on monitored data of the monitored status stored in the managing section 11 (managing table), so that the operating status of the printer apparatus 1 within a predetermined time period, which may be daily, weekly, monthly, or yearly, can be grasped at a glance in reference to each time scale (in time series).

As described, operating the current status key 20*c* of the operator panel 20, when accompanied by a request for graphic display of the operating status of the printer apparatus 1, causes the processing section 12 to create graphic display based on information managed by the managing section 11.

The information of the operating status in the form of graphic display is displayed in the display section 20*a* of the operator panel 20 by the CPU 18. The information of the operating status in the form of graphic display, other than being displayed in the display section 20*a*, may be outputted as a print image from the recording section 19 of the printer apparatus 1, or outputted to an electronic apparatus, such as the externally provided personal computer 4 that can communicate with the printer apparatus 1 via a network.

The graphic display of the operating status is designed such that the activity rate of the apparatus can be grasped on the basis of a time scale or time, using the horizontal axis as a time axis.

Further, the horizontal axis representing time can be switched to show different time scales, such as day, week, month, and year, using the keys of "PRINT COUNTS" "SCANNER COUNTS", and "FAX COUNTS" (selecting section), so that an operating status within a predetermined time period can be grasped. That is, it is possible to create graphic display of an operating status of the printer apparatus 1 within a specific time period.

Figure 6:
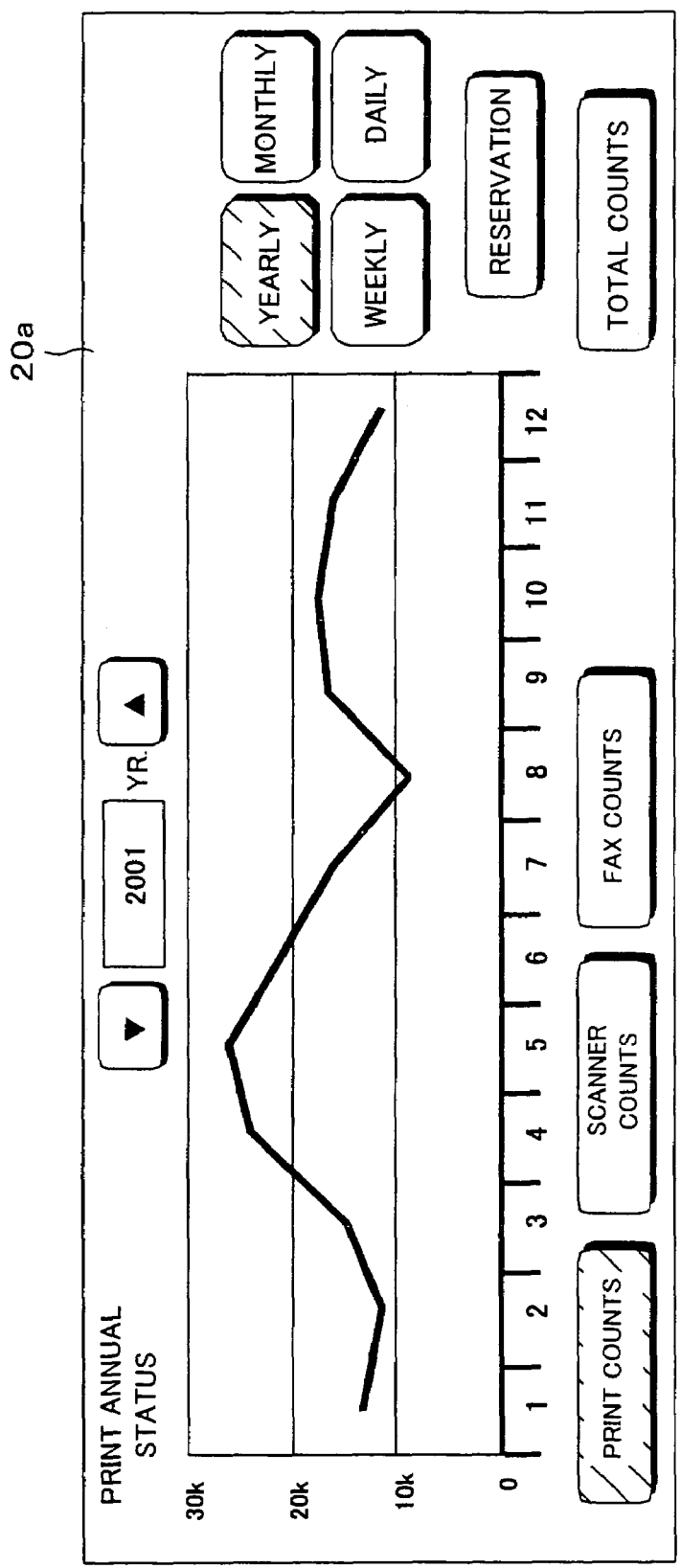
FIG. 6 is a magnified view of the graphic display of FIG. 5.

FIG. 6 is graphic display of an annual operating status in the form of a line chart (the same as FIG. 5 except for the non-display portion). Shown in the display screen of FIG. 6 is level display (graphic display) of the operating status in year 2001, which was obtained by counting an operating status on a monthly basis.

Figure 7:
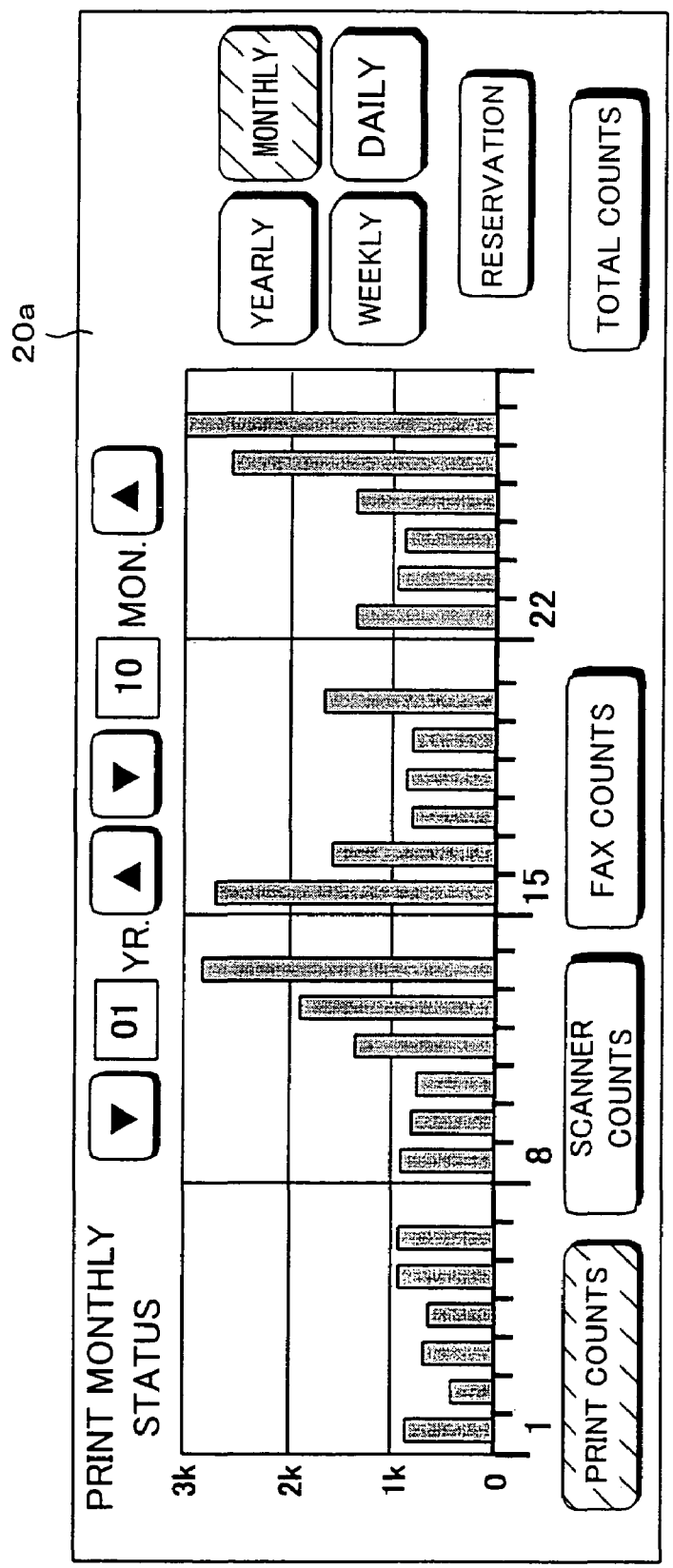
FIG. 7 is a plan view of the operator panel, showing an example of graphic display displaying a monthly operating status (print counts) in the operator panel.
Figure 8:
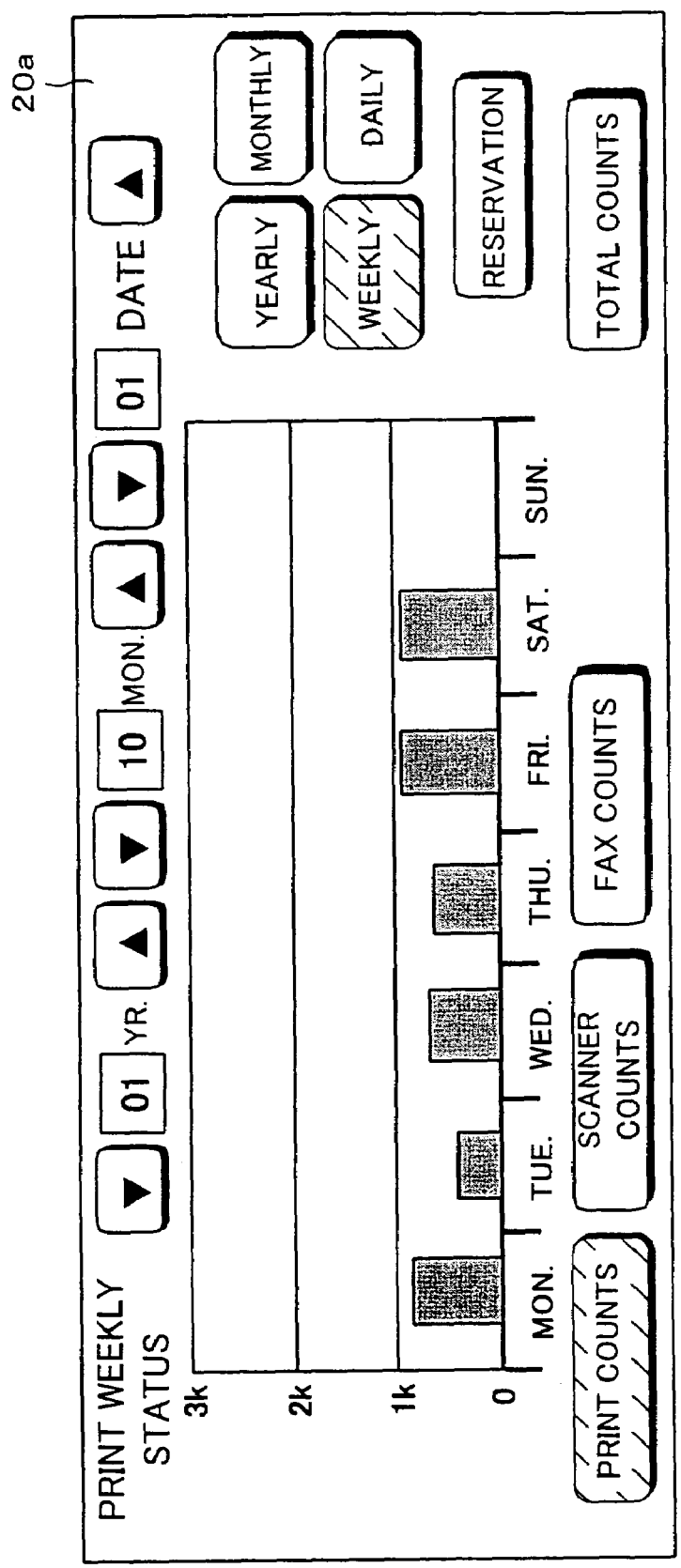
FIG. 8 is a plan view of the operator panel, showing an example of graphic display displaying a weekly operating status (print counts) in the operator panel.
Figure 9:
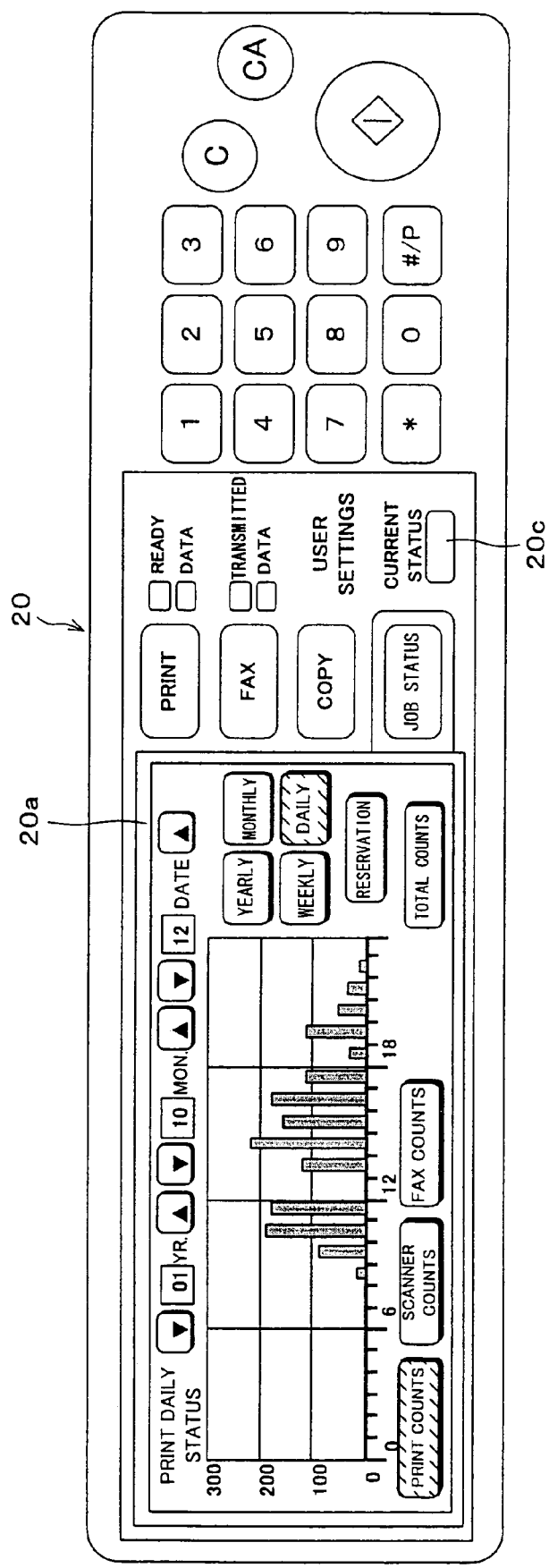
FIG. 9 is a plan view of the operator panel, showing an example of graphic display displaying a daily operating status (print counts) in the operator panel.
Figure 10:
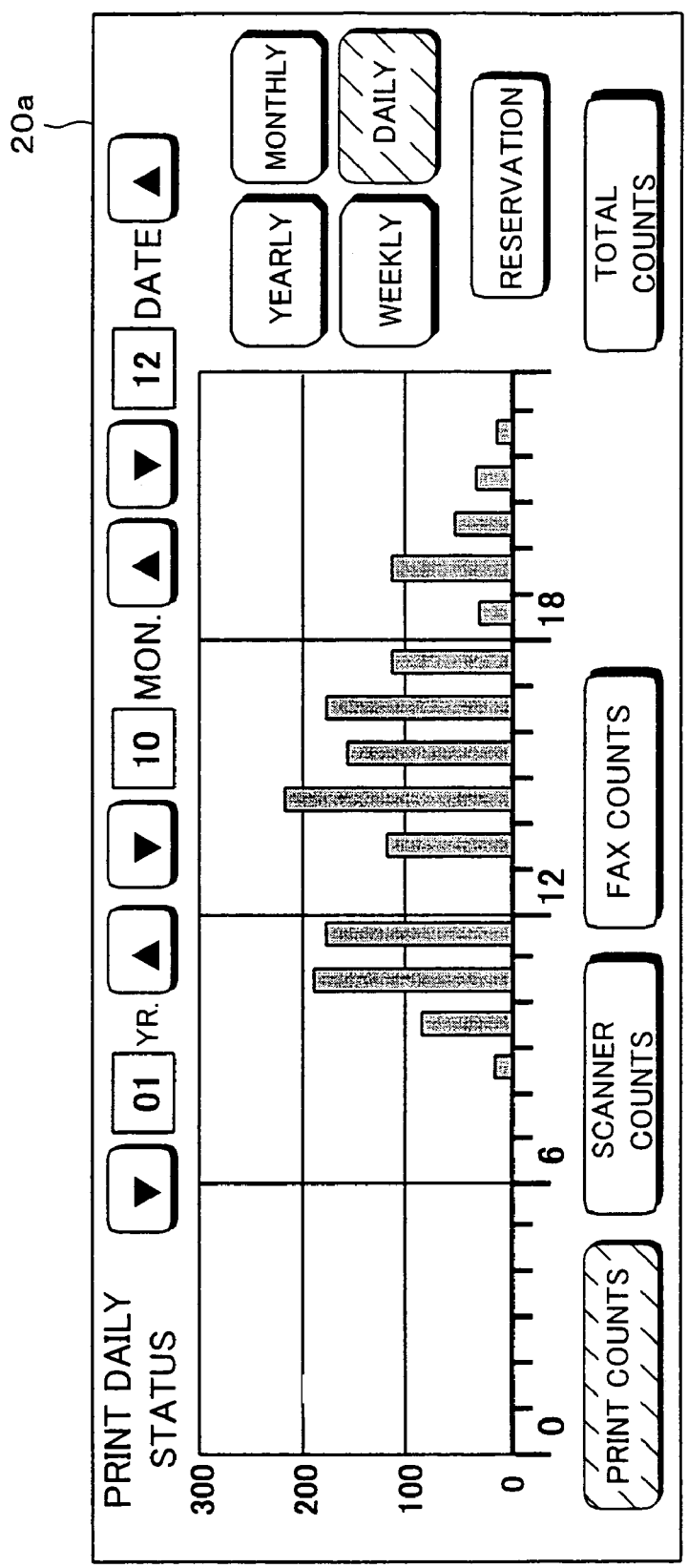
FIG. 10 is a magnified view of the graphic display of FIG. 9.

FIG. 7 is graphic display of a monthly operating status in the form of a bar chart. Shown in the display screen of FIG. 7 is level display of the operating status in October 2001, which was obtained by counting an operating status on a daily basis. FIG. 8 is graphic display of a weekly operating status in the form of a bar chart. Shown in the display screen of FIG. 8 is level display of the operating status in the first week of October 2001, which was obtained by counting an operating status on a daily basis. FIG. 9 and FIG. 10 are graphic display of a daily operating status. Shown in the display screens of FIG. 9 and FIG. 10 is level display of the operating status in a day, which was obtained by counting an operating status of Oct. 12, 2002 on an hourly basis.

[Second Embodiment]

Figure 11:
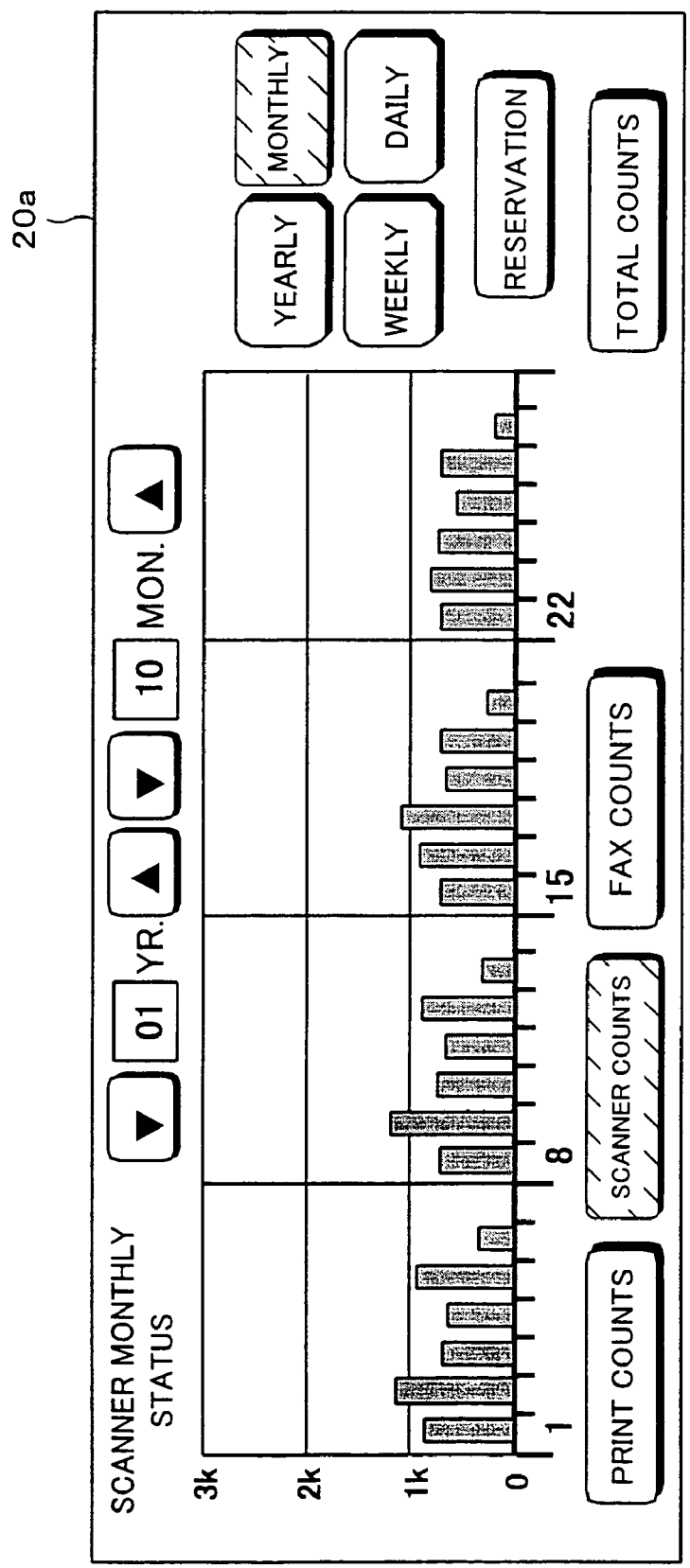
FIG. 11 is a plan view of the operator panel, showing an example of graphic display displaying a monthly operating status (scanner counts) in the operator panel.
Figure 12:
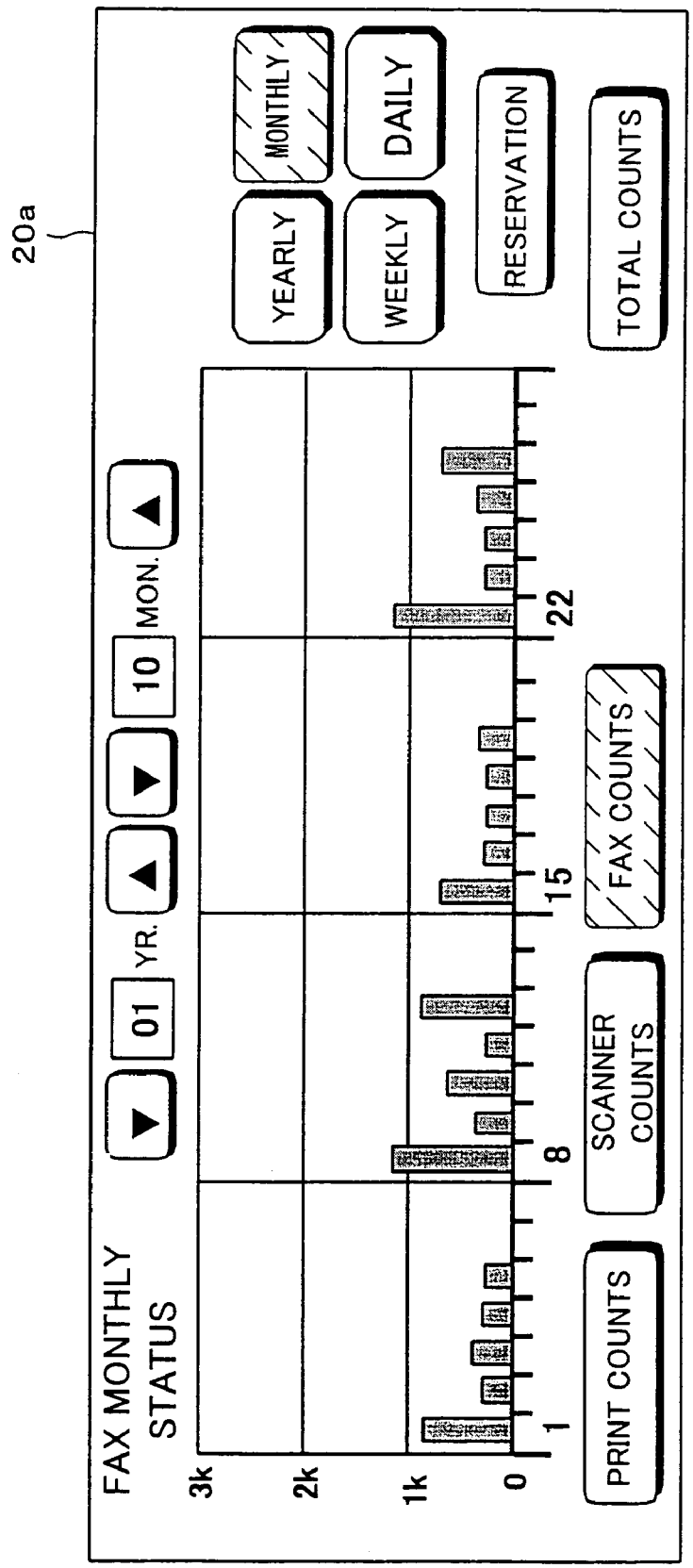
FIG. 12 is a plan view of the operator panel, showing an example of graphic display displaying a monthly operating status (FAX counts) in the operator panel.
Figure 13:
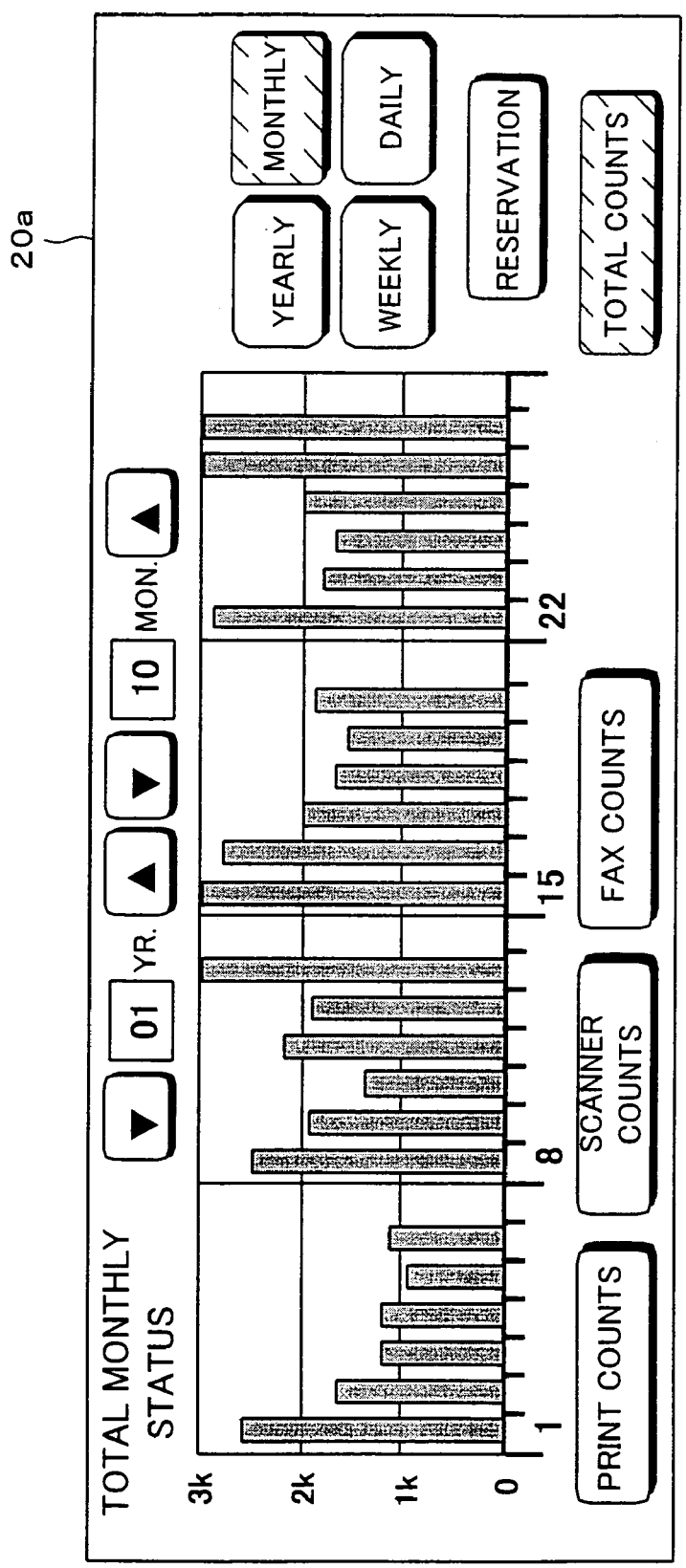
FIG. 13 is a plan view of the operator panel, showing an example of graphic display displaying a monthly operating status (total counts) in the operator panel.

In a Second Embodiment of the present invention, the processing section 12 of the printer apparatus 1, based on the operating status monitored data of the apparatus managed by the managing section (managing table) 11 creates graphic display of an operating status of each processing unit, such as the scanner apparatus (scanner unit) 3 and the FAX unit 15, of an apparatus complex connected to the printer apparatus 1, in addition to creating graphic display of an operating status for the printer apparatus 1, so that the operating status can be grasped at a glance, as shown in FIG. 11 through FIG. 13.

As described above, operating the current status key 20*c* of the operator panel 20, when accompanied by a request for graphic display of the operating status of the apparatus complex, causes the processing section 12 to create graphic display based on information managed by the managing section 11. The information of the operating status in the form of graphic display is displayed in the display section 20*a* of the operator panel 20 by the CPU 18, as shown in FIG. 6 through FIG. 10.

The information of the operating status in the form of graphic display, other than being displayed in the display section 20*a*, may be outputted as a print image from the recording section 19 of the printer apparatus 1, or outputted to an electronic apparatus, such as the externally provided personal computer 4 that can communicate with the printer apparatus 1 via a network.

In principle, operating the current status key 20*c* first indicates (displays) the operating status (print counts) of the printer apparatus 1 in the form of graphic display.

The graphic display of the operating status is designed such that the activity rate of the apparatus can be grasped on the basis of a time scale or time, using the horizontal axis as a time axis.

Further, the horizontal axis representing time can be switched to show different time scales, such as day, week, month, and year, using the keys of "YEARLY", "MONTHLY", "WEEKLY", and "DAILY" (selecting section), so that an operating status within a predetermined time period can be grasped. That is, it is possible to create graphic display of the operating status "PRINT COUNTS" of the printer apparatus 1 within a specific time period.

That is, the "PRINT COUNTS" is graphic display of an operating status of a print job, which is entered in a printer mode, a copy print mode, or a FAX reception print mode, etc., in the printer apparatus of the apparatus complex.

Referring to FIG. 5, the display panel of the display section 20*a* has the "SCANNER COUNTS" key, "FAX COUNTS" key, and "TOTAL COUNTS" key, in addition to the "PRINT COUNTS" key.

The "SCANNER COUNTS" KEY is used to create graphic display of an operating status of a document image scan job (copy document scan mode, FAX transmission document scan mode, e-mail attached document scan mode) in the scanner apparatus 3 connected to the printer apparatus 1 in the apparatus complex, as shown in FIG. 11.

The "FAX COUNTS" key is used to create graphic display of an operating status of a send/receive job (FAX sending mode and FAX receiving mode via a conventional telephone line, Internet FAX sending mode and Internet FAX receiving mode using an e-mail function) of the FAX unit 15 connected to the printer apparatus 1 in the apparatus complex, as shown in FIG. 12.

The "TOTAL COUNTS" key is used to create graphic display of an operating status of a system complex of the printer apparatus 1, the scanner apparatus 3, and the FAX unit 15, as shown in FIG. 13.

In the graphic display screens of "SCANNER COUNTS", "FAX COUNTS", and "TOTAL COUNTS", an operating status within any time period can be displayed in graphic display, as shown in FIG. 6 through FIG. 10, by operating the keys of "YEARLY", "MONTHLY", "WEEKLY", and "DAILY" that are displayed substantially in the right half of the display screen of the display section 20*a*, as shown in FIG. 11 through FIG. 13.

[Third Embodiment]

In a Third Embodiment of the present invention, a user is able to make a reservation for a new print job, observing the graphic display of the operating status of the printer apparatus 1.

A reservation for a new job can be entered by operating the "RESERVATION" key (reservation instructing section) that is provided substantially in the right half of the display screen of the display section 20*a* in the operator panel 20 of FIG. 5 (the same for the screens of FIG. 6 through FIG. 9).

Figure 14:
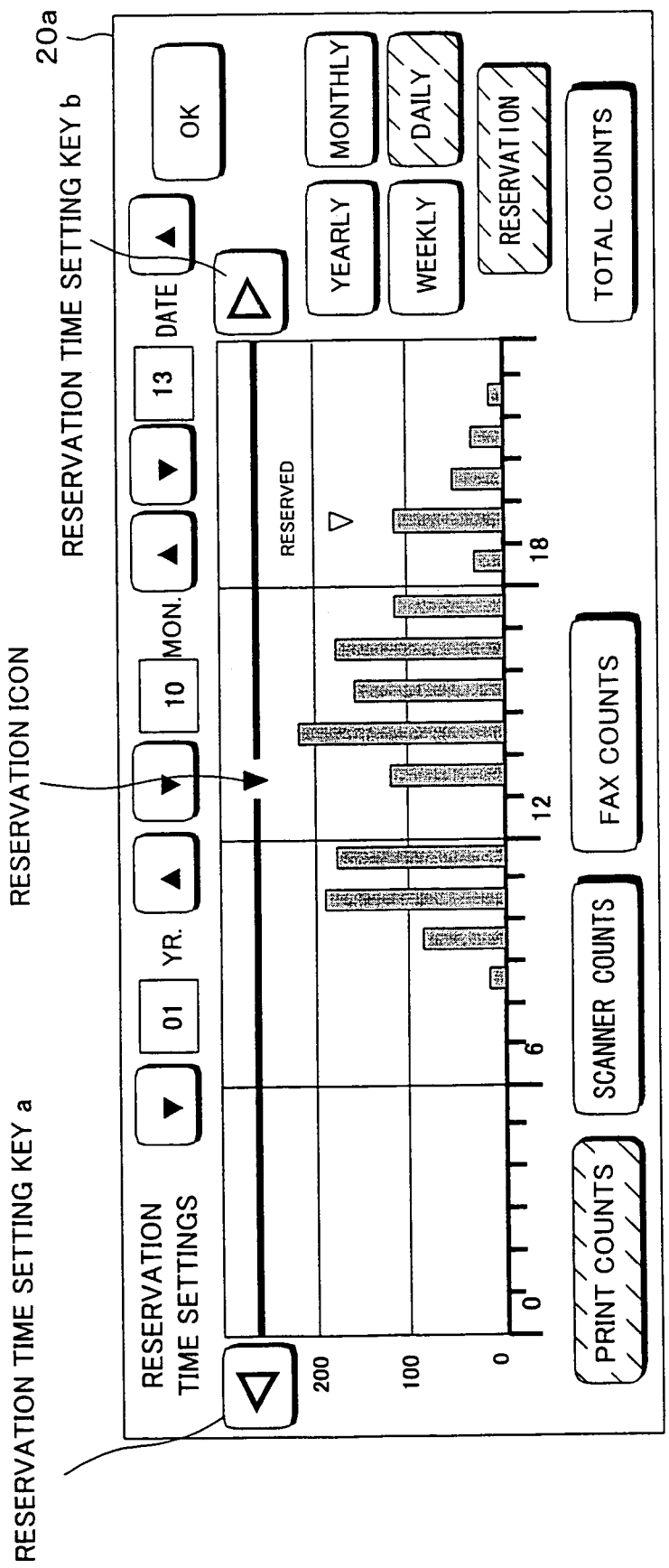
FIG. 14 is a plan view of the operator panel, showing an example of graphic display displaying a daily operating status (print counts) with a reservation icon in the operator panel.
Figure 15:
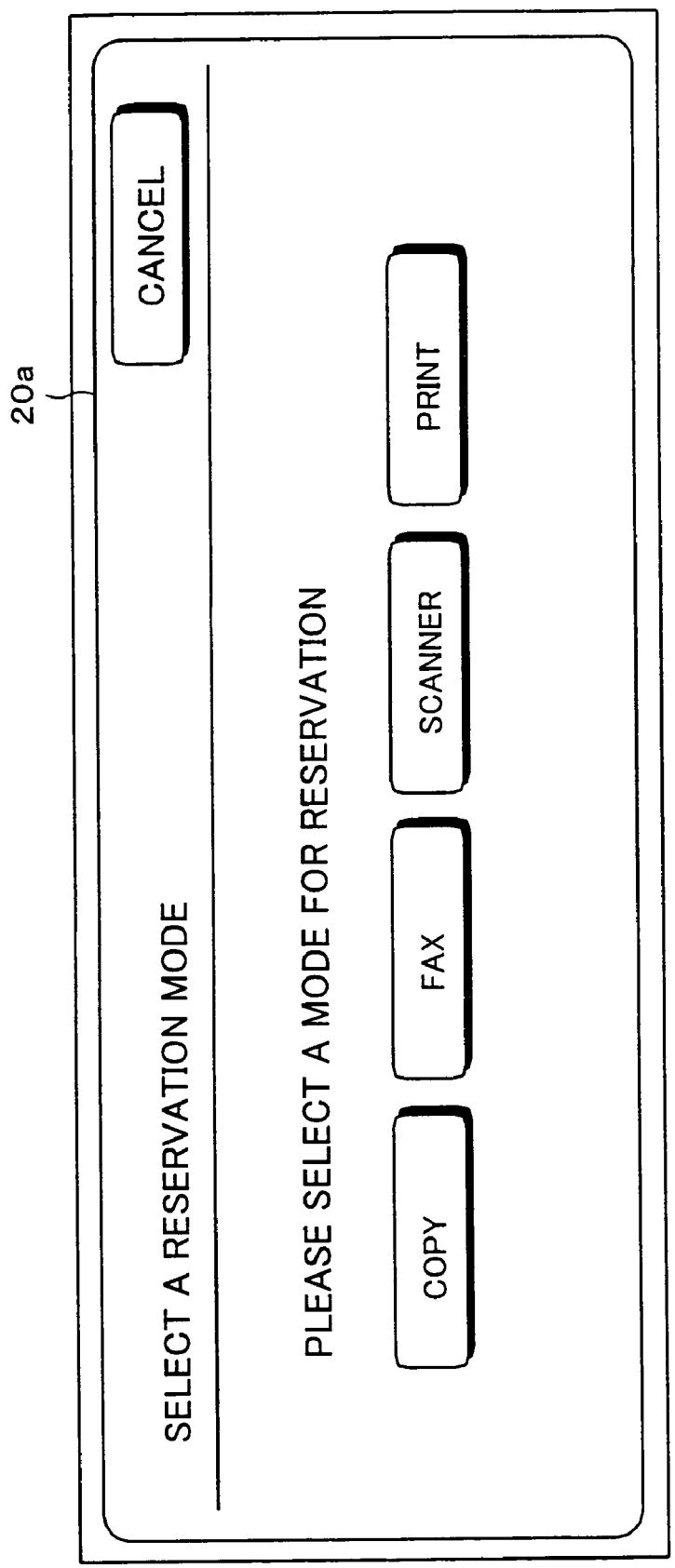
FIG. 15 is a plan view of the operator panel for selecting a reservation mode, after specifying a reservation time with the reservation icon.

For example, when the "RESERVATION" key is operated in the graphic display of the operating status in the time scale of a day as shown in FIG. 10, the screen displays reservation instructing display as shown in FIG. 14. The CPU (reservation mark displaying section) 18 displays a reservation icon at a time location that corresponds to the current time. In case where a reserved job already exists, another reservation icon indicating "RESERVED" is also displayed.

The user sets a reservation time by moving the reservation icon to a desired time location, using a reservation time setting key a and a reservation time setting key b. Observing the graphic display of the operating status, the user checks the displayed information in the graphic display for his or her reference. If a job has been reserved already, the user reserves a new job, avoiding the already reserved job. Operating the "OK" key (reservation completion instructing section) on the upper right side of the screen completes setting the reservation time and displays a screen for selecting a reservation mode. The display waits for further instructions for making a job reservation.

Figure 16:
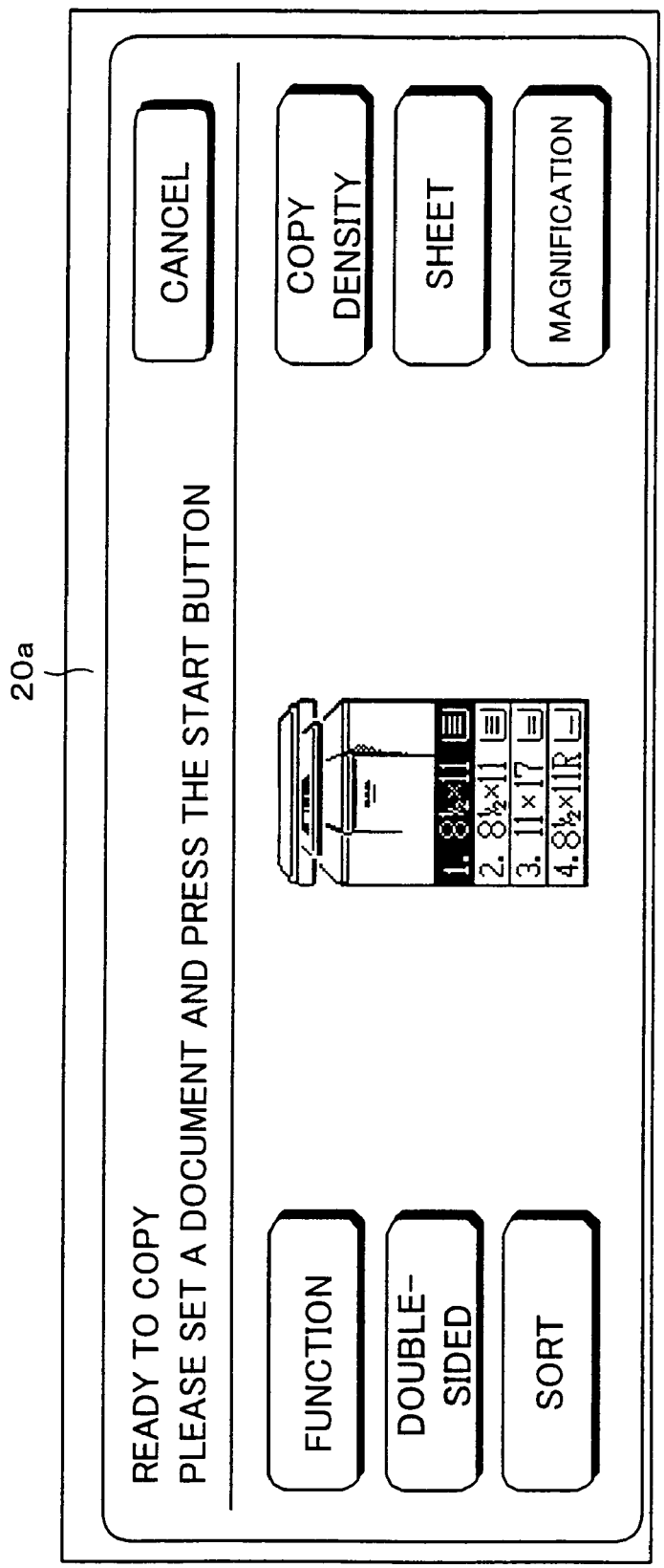
FIG. 16 is a plan view of the operator panel after selecting a copy mode for the reservation.

Here, the user selects a mode for the reserved job from "COPY", "FAX", and "PRINT". For example, when the user selects a "COPY" reservation, a normal copy mode selecting screen as shown in FIG. 16 is displayed and the user enters instructions for the reserved document in a copy mode.

With the reserved document placed on an automatic document feeder of the scanner apparatus 3, operating the copy button on the operator panel 20 starts reading the reserved document. The data of the reserved document so read is converted one after another into image data and stored in a memory as image data of the reserved job.

Figure 17:
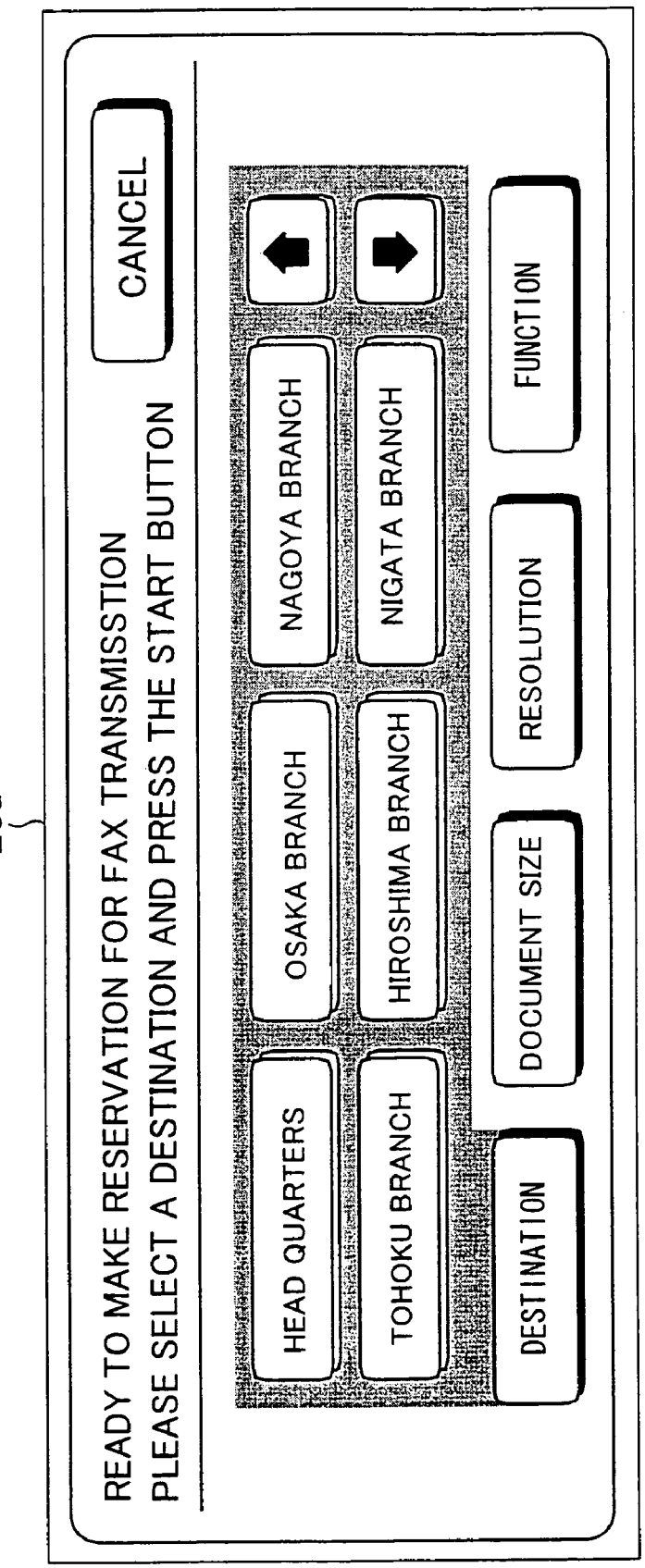
FIG. 17 is a plan view of the operator panel after selecting a FAX mode for the reservation.

Selecting a "FAX" reservation displays a normal FAX sending mode selecting screen as shown in FIG. 17, and the user enters instructions for the reserved document in a sending mode. With the reserved document placed on the automatic document feeder of the scanner apparatus 3, operating the copy button on the display panel 20 starts reading the reserved document. The data of the reserved document so read is converted one after another into image data and stored in a memory as image data of the reserved job.

Figure 18:
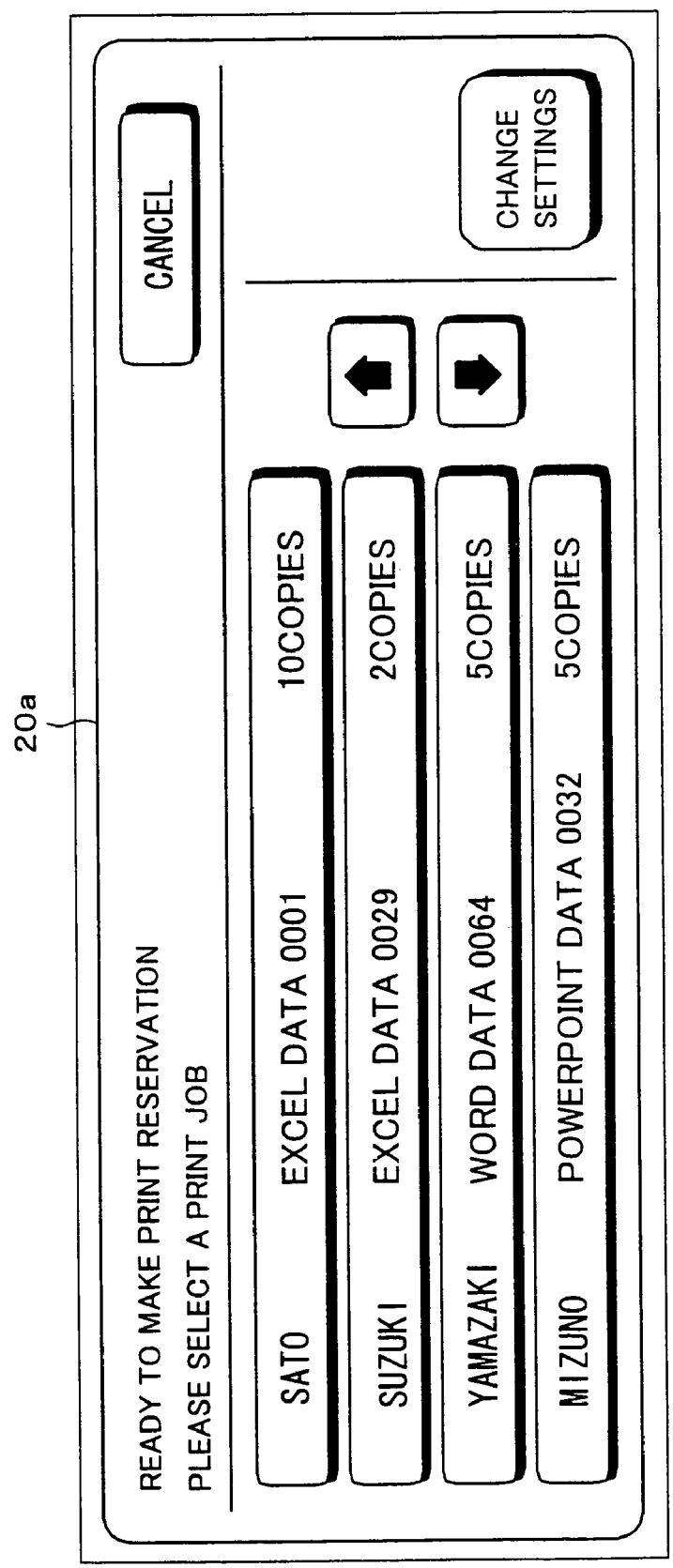
FIG. 18 is a plan view of the operator panel after selecting a print mode for the reservation.

Selecting a "PRINT" reservation displays a list of print jobs that are stored in a print BOX (memory) of the printer apparatus 1 of FIG. 18 (the list of print jobs is stored in the memory of the printer apparatus 1 at the request of the personal computer 4 via the network). From these print jobs, the user selects a job that corresponds to the reserved job. Operating the copy button on the operator panel 20 manages the job as image data of the reserved job.

Figure 19:
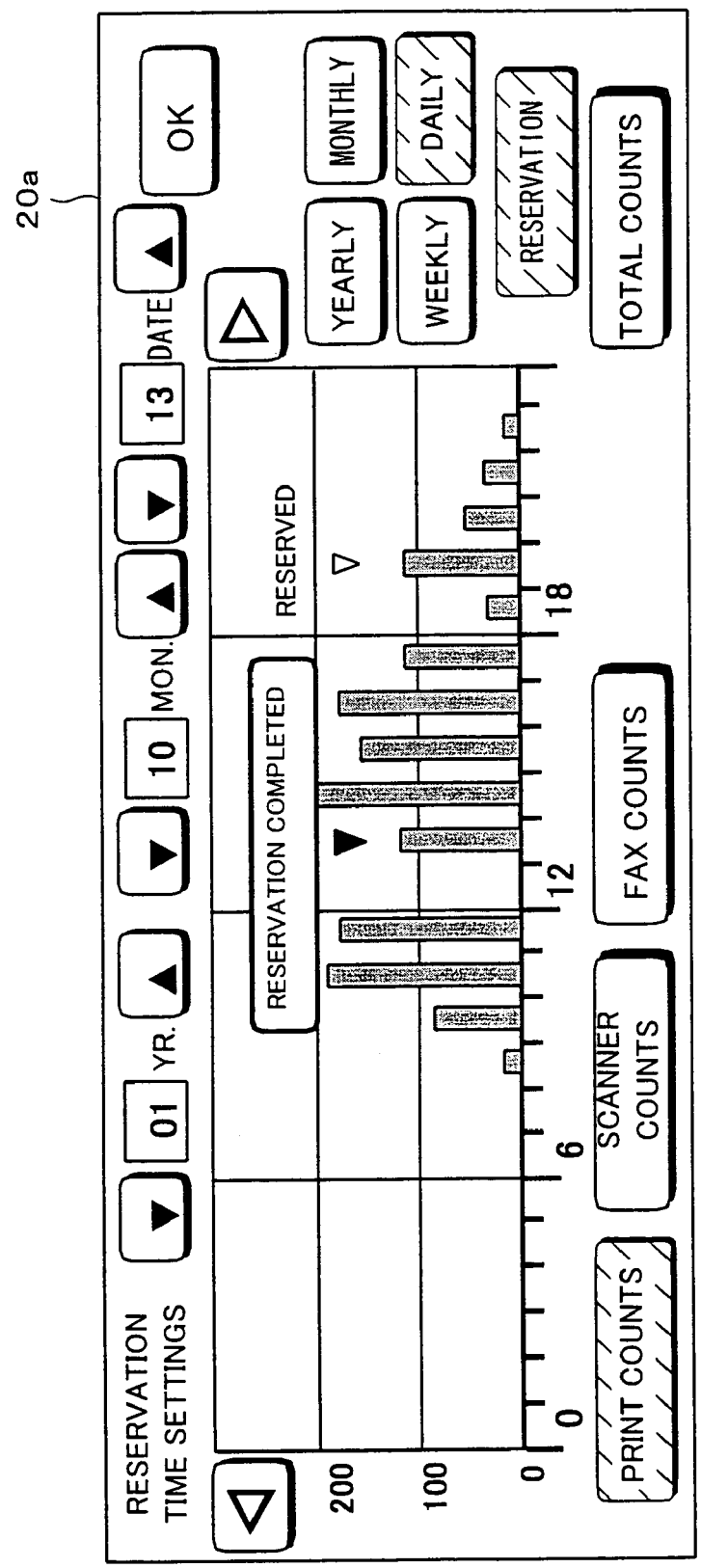
FIG. 19 is a plan view of the operator panel, indicating that the reservation has been completed.

As described, making a reservation for a "COPY" mode, a "FAX" mode, and a "PRINT" mode graphically displays the operating status, as shown in FIG. 19 or essentially FIG. 14. The user is then able to confirm on the graphic display that the job reservation has been completed.

As described, the user is able to make a job reservation in a time scale as he or she desires, after confirming the operating status of each component. (job reservations are set in the same manner.) The foregoing described the user procedures for making a new job reservation by observing the operating status of the apparatus.

[Fourth Embodiment]

For stable operations of each component of the electrically controlled apparatus such as the printer apparatus 1 and for ensured image recording, it is essential that the electronically controlled apparatus be inspected and expendables be replaced and adjusted. The administrator of the electronically controlled apparatus usually decides when to place the apparatus for regular inspection by confirming the operating status of the electronically controlled apparatus. Ideally, the electronically controlled apparatus should be inspected when it is not too busy.

In order to eliminate the administrator's inconvenience of going to the site of the apparatus and confirm the operating status thereof, a Fourth Embodiment of the present invention enables a user to control and confirm the electronically controlled apparatus from a remote location via communication paths 2 such as a telephone line or a network, or by using communicating means such as radio transmission.

To this end, the managed data of the managing table 22 of FIG. 4, which is provided on the side of the printer apparatus 1, is sent to a terminal of the administrator via the communicating means. The managed data is processed in the terminal to create graphic display of the managed data.

Alternatively, the graphic display may be created in the printer apparatus 1 and sent to the terminal of the administrator in the form of image data. Here, in principle, the graphic display is created in the manners described in the foregoing First through Third Embodiments.

In order to find the time the apparatus may be temporarily arrested for regular inspection without causing problems, the administrator, when externally confirming an operating status of the electronically controlled apparatus via the communication paths 2, switches the graphic display, for example, from monthly display to daily display, so as to narrow down the timing the apparatus may be arrested.

Because a regular inspection temporarily arrests the entire operation of the electronically controlled device, a priority is given to the graphic display of an operating status of the entire electronically controlled apparatus. Knowing the operating status of the apparatus, the administrator makes a reservation for a regular inspection in the same manner as that for making a job reservation, as described in FIG. 14.

Figure 20:
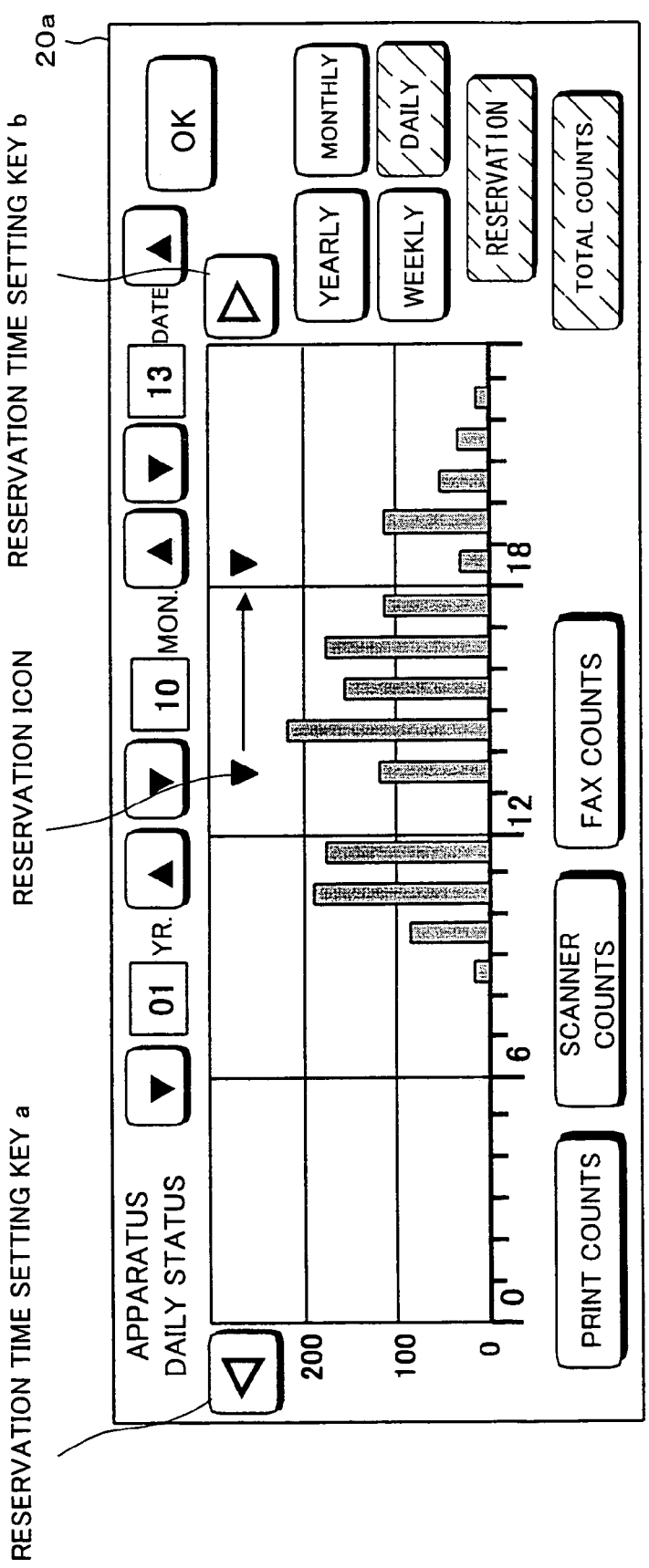
FIG. 20 is a plan view of the operator panel, showing one example of graphic display of a daily operating status (total counts) with the reservation icon in the operator panel.

Specifically, the administrator makes an inspection reservation by moving an inspection reservation icon to an appropriate time location, using the reservation time setting key a and the reservation time setting key b, as shown in FIG. 20. Operating the "OK" key enters the inspection reservation into the printer apparatus 1 for schedule management and completes the reservation. In the example of FIG. 20, in order to make a reservation for a regular inspection at around 18:00, the reservation time setting key b is used to move the reservation icon toward the 18:00 o'clock position and the "OK" key is operated to complete the reservation.

Once the reservation for a regular inspection is made, the schedule management data (inspection reservation information) is reflected in the graphic display of an operating status of the electronically controlled apparatus when the operating status is confirmed. This helps the user to confirm the schedule when making a job reservation.

Note that, the environment where the administrator is allowed to externally confirm the operating status of the electronically controlled apparatus may be brought to the user environment using the personal computer 4 on the network. This allows the users to confirm the operating status of the electronically controlled apparatus and make a job request to the electronically controlled apparatus from the location of the personal computer 4.

The criteria used to distinguish the administrator from common users are as follows. The printer apparatus 1 has a normal mode, in which common users use the printer apparatus 1 in an ordinary manner, and an inspection mode (distinguishing section), in which the administrator inspects and adjusts the printer apparatus 1.

Between these two modes, a transition is made to the inspection mode when the administrator enters specific operations in the normal mode (e.g., entry of a command or password by key operations, key switching, giving instructions upon receipt of a command via communications). A transition from the inspection mode to the normal mode is made by similar operations.

Operating the current status key 20*c* in the normal mode graphically displays an operating status of each component as a user guide, allowing the user to make a job reservation using the graphic display, for example. On the other hand, operating the current status key 20*c* in the inspection mode graphically displays an operating status as a guide for the administrator, allowing the administrator to make a reservation for maintenance (inspection, adjustment) using the graphic display.

[Fifth Embodiment]

(Confirming an Operating Status and an Optimum Level)

Referring to FIG. 5, the processing section 12 of the printer apparatus 1, based on the operating status monitored data of the apparatus managed by the managing section (managing table) 11, creates graphic display of an operating status of each processing unit, such as the scanner apparatus (scanner unit) 3 and the FAX unit 15, of an apparatus complex connected to the printer apparatus 1, in addition to creating graphic display of an operating status for the printer apparatus 1 (printer unit), so that the operating status can be grasped at a glance.

In the present embodiment, the current status key 20*c* is used to confirm the optimum level of the electronically controlled apparatus, and the print annual status is displayed first. This is because the availability of the printer apparatus 1 in the last year should be understood from the data of graphic display in the display section 20*a*.

As described earlier, operating the current status key 20*c* in the operator panel 20, when accompanied by a request for graphic display of the operating status of the apparatus complex, causes the processing section 12 to create the graphic display based on information managed by the managing section 11. The information of the graphically displayed operating status is then displayed in the display section 20*a* of the operator panel 20 by the CPU 18.

Figure 21:
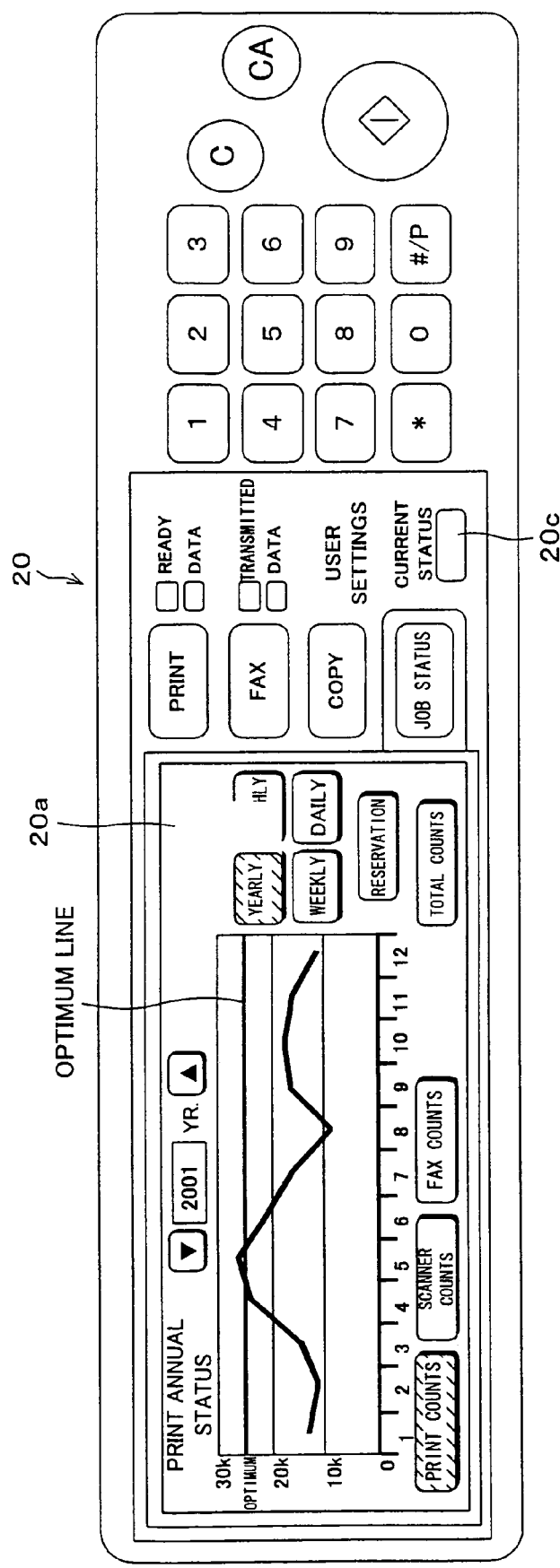
FIG. 21 is a plan view of the operator panel, showing one example of graphic display displaying an annual operating status (print counts) with an optimum level in the operator panel.

For example, as shown in FIG. 21, the CPU 18 explicitly displays an optimum level (optimum line), which indicates a projected processing ability of the printer apparatus 1, in the graphic display. This helps the user to decide whether the operating status of his or her electronically controlled apparatus such as the printer apparatus 1 is at its optimum level.

Figure 22:
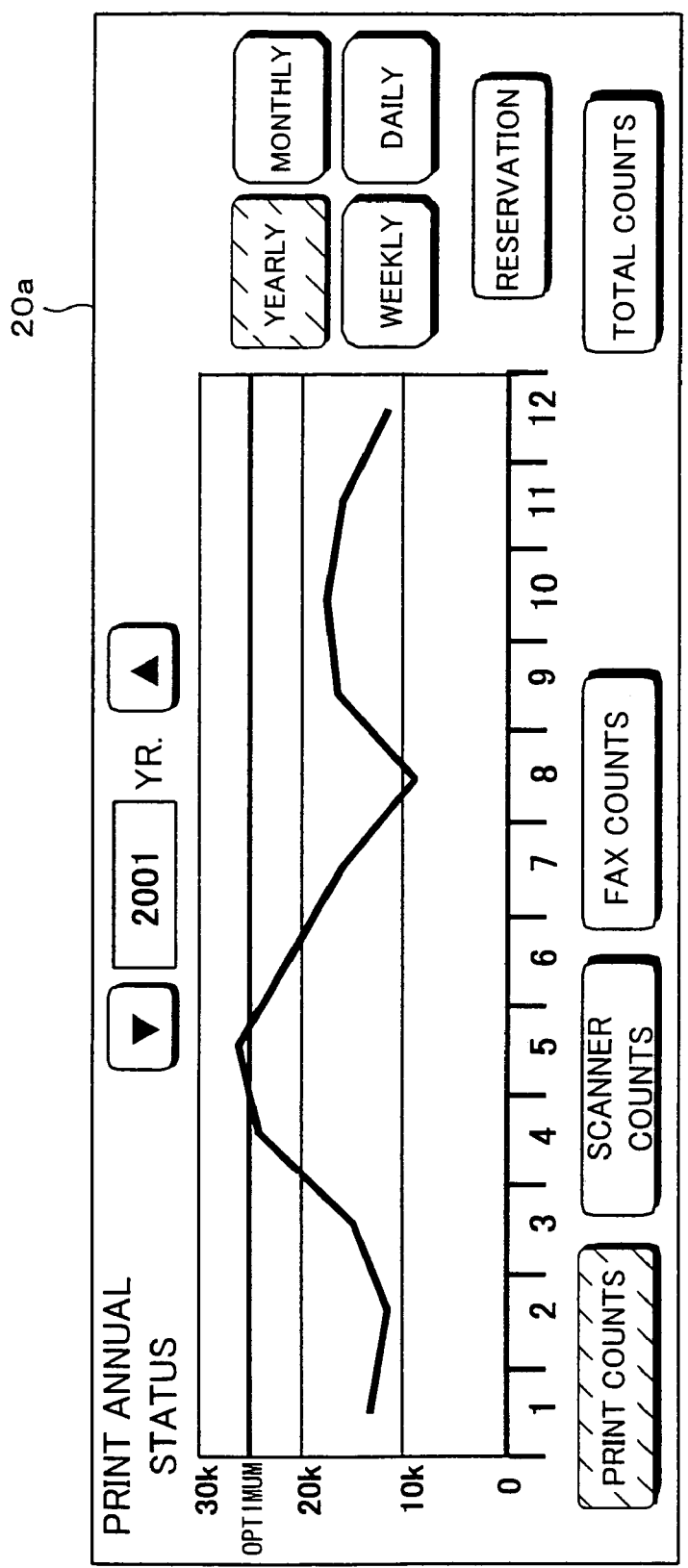
FIG. 22 is a magnified view of the graphic display of FIG. 21.
Figure 23:
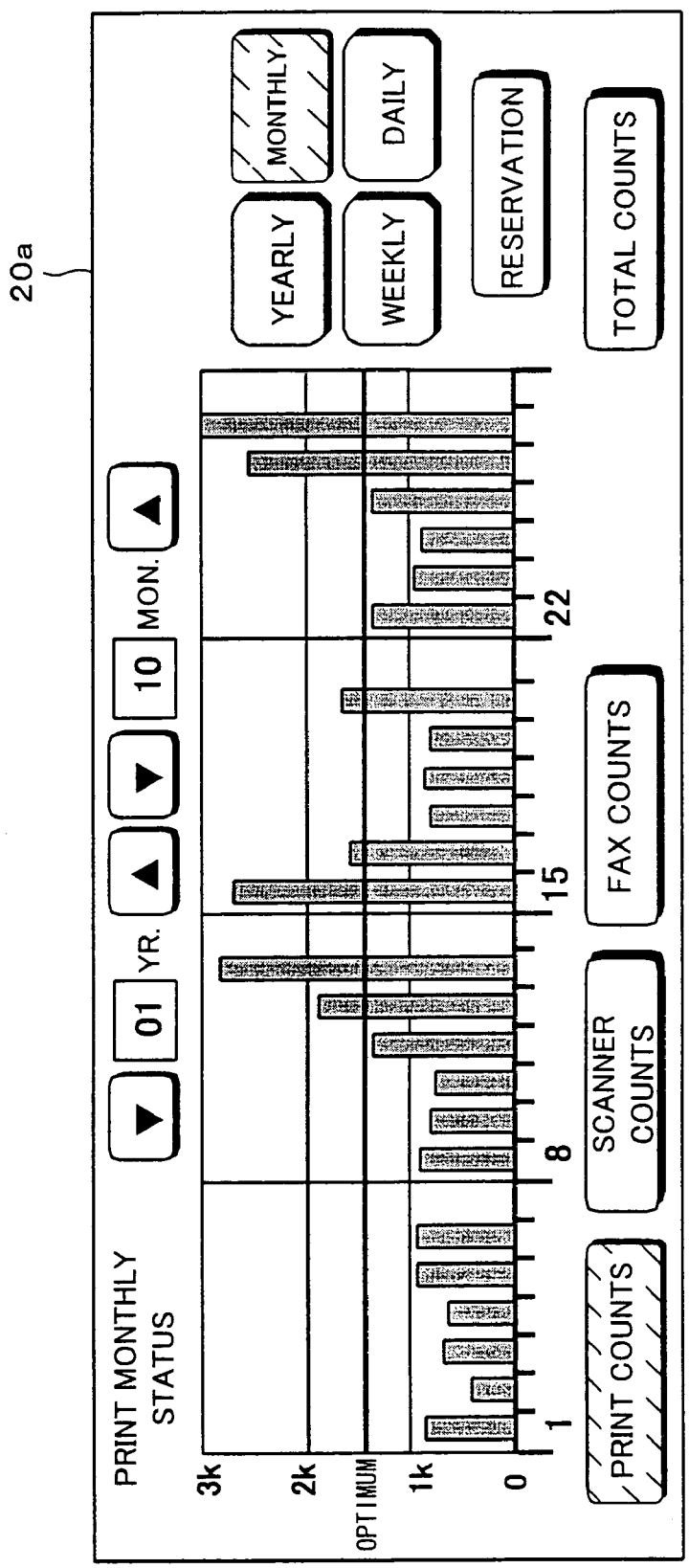
FIG. 23 is a plan view of the operator panel, showing one example of graphic display displaying a monthly operating status (print counts) with an optimum level in the operator panel.

FIG. 22 is a magnified view of the display screen of the display section 20*a* in the operator panel 20 of FIG. 21, showing level display of an annual operating status that was obtained by counting the operating status of year 2001 on a monthly basis. FIG. 23 is graphic display of a monthly operating status that was obtained by counting the operating status of October 2001 on a daily basis.

Figure 24:
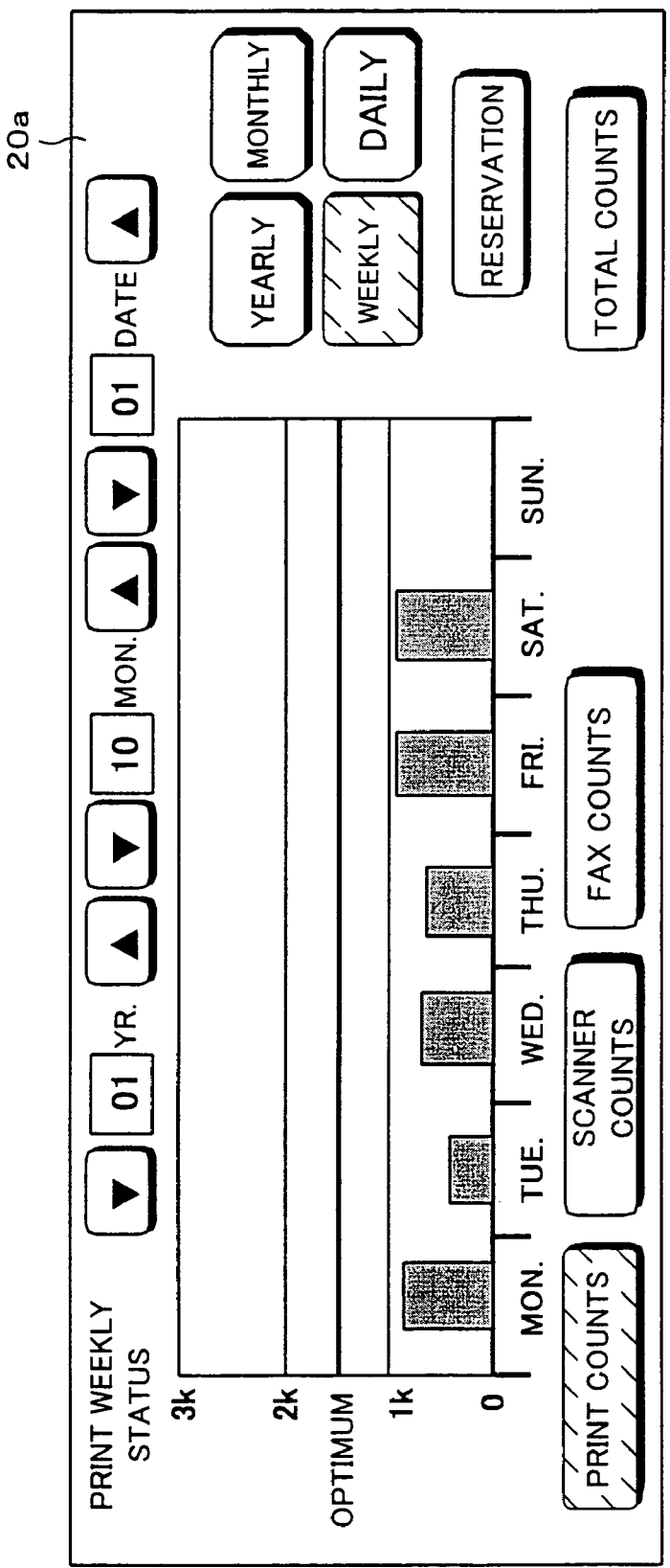
FIG. 24 is a plan view of the operator panel, showing one example of graphic display displaying a weekly operating status (print counts) with an optimum level in the operator panel.

FIG. 24 is graphic display of a weekly operating status that was obtained by counting the operating status of the first week of October 2001 on a daily basis.

Figure 25:
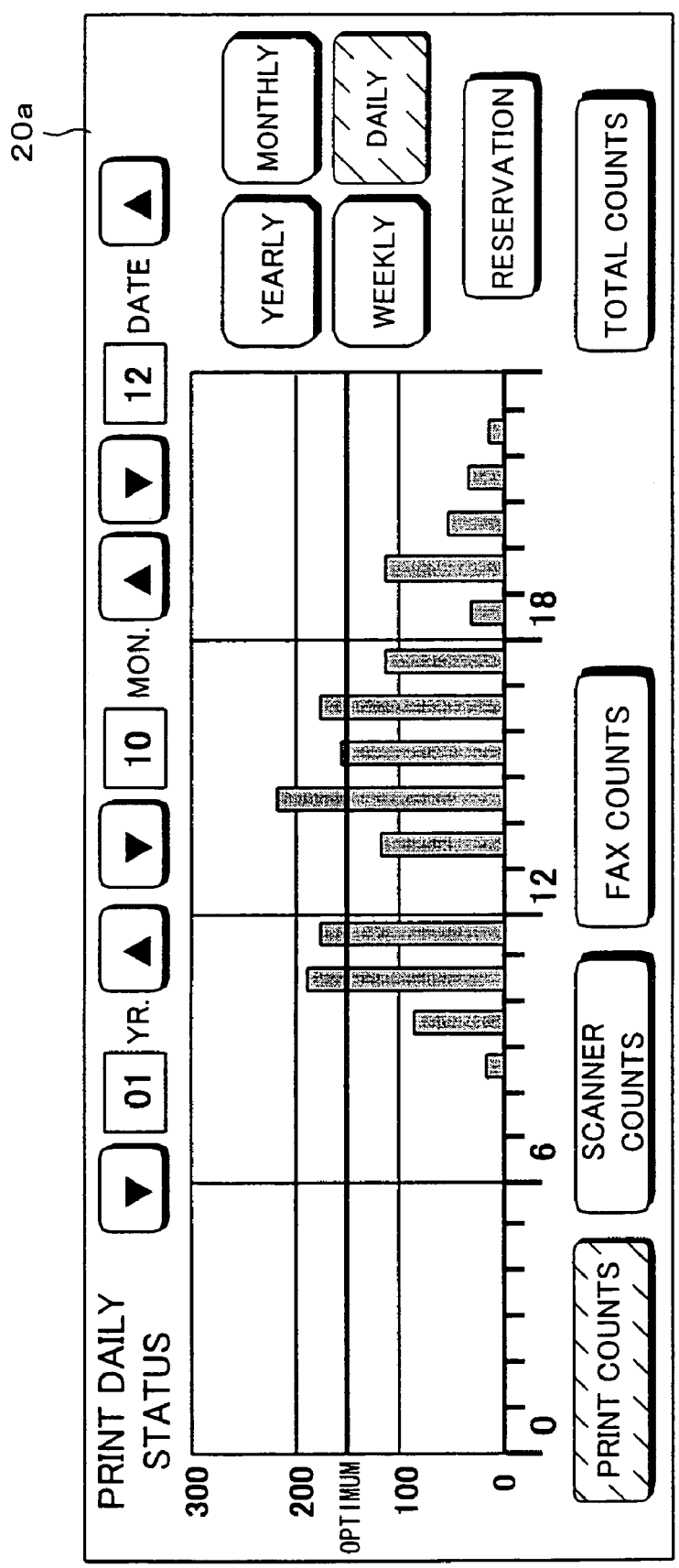
FIG. 25 is a plan view of the operator panel, showing one example of graphic display displaying a daily operating status (print counts) with an optimum level in the operator panel.

FIG. 25 is graphic display of a daily operating status that was obtained by counting the operating status of Oct. 12, 2001 on an hourly basis.

As described, the "PRINT COUNTS" is graphic display of print jobs (print jobs entered in a printer mode, copy print mode, FAX reception print mode) in the printer apparatus 1 of the apparatus complex. Knowing the graphically displayed operating status of the printer apparatus 1 with respect to the whole apparatus and each unit (mode) of the apparatus, one can access the need for a new system (replacement, addition, or removal of the system) that is suitable for the system environment.

Further, by selecting the "SCANNER COUNTS", "FAX COUNTS", or "TOTAL COUNTS", its optimum level can easily be confirmed.

The present invention differs from prior art in the following respects. Japanese Publication for Unexamined Patent Application No. 277580/1991 (Tokukaihei 3-277580; published on Dec. 9, 1991) discloses measuring time and counting cycles of print operations of the printer so as to manage the total time each printer is used. However, the invention of this publication merely finds the total operating time of the printer since the time the printer was installed. This is different from the present invention that finds the operating status in a given time scale.

Japanese Publication for Unexamined Patent Application No. 134142/1999 (Tokukaihei 11-134142; published on May 21, 1999) teaches confirming the current operating status of the printer on the client's side. The invention of this publication merely finds the current operating status, not the operating status in a given time scale.

Further, Japanese Publication for Unexamined Patent Application No. 227299/1999 (Tokukaihei 11-227299; published on Aug. 24, 1999) teaches managing operating history information, including total print counts, print counts of a day, the number of processed jobs, the number of paper jams, and the frequency of paper jams, so as to inform the managed information upon receipt of a request from outside. The invention of this publication merely manages the past operating status in the form of data and informs the data in response to a request from outside. This is different from the present invention that finds the operating status (operating history) in a given time scale.

As described, an electronically controlled apparatus of the present invention includes: an input-output section, which electronically processes and outputs input data; a control section, which electronically controls the input-output section according to operating status data of each component of the input-output section; a managing section, which monitors the operating status data of each component of the input-output section, so as to store and manage the operating status data with corresponding time information of the operating status data; and a processing section, which creates graphic display of the operating status data in a given time scale according to the operating status data and the time information.

According to this configuration, by the provision of the processing section that creates graphic display of the operating status of each component, the operating status of each component can be graphically displayed. This enables an operator to visually confirm a load on each component and its surrounding environment, allowing the operator to give new instructions or consider other options based on the graphically displayed operating status.

The foregoing configuration is also advantageous for the administrators. Namely, it makes it easier for the administrators to perform daily management, such as replenishing of expendables such as paper or a developer, so as to prevent operations of each component from being arrested.

The electronically controlled apparatus preferably includes an instructing section, which instructs the processing section to graphically display the operating status data.

According to this configuration, the instructing section gives instructions for graphically displaying managed operating status data with regard to an operating status of each component. This enables the corresponding data of the operating status to be graphically displayed as required (when it is effective) based on the managed operating status data, thereby enabling the operator to easily confirm the operating status of each component.

The electronically controlled apparatus preferably includes a setting section, which sets a time scale for the processing section to create the graphic display of the operating status data.

According to this configuration, the operating status is graphically displayed in a given time scale of a predetermined time period (hour, week, month). This makes it easier to grasp the operating status of each component and thereby makes the apparatus more manageable.

As described, another electronically controlled apparatus of the present invention includes: a plurality of processing units, each including an input-output section, which electronically processes and outputs input data; and a control section, which electronically controls the input-output section according to operating status data of each component of the input-output section; a managing section, which monitors the operating status data of each component of each processing unit, so as to store and manage the operating status data with corresponding time information of the operating status data; and a processing section, which creates (processes) graphic display of the operating status data in a given time scale according to the operating status data and the time information.

According to this configuration, the operating status of the apparatus complex is graphically displayed for each processing unit (scanner unit, printer unit, fax unit, etc.). This enables an operator to visually confirm a load on each processing unit and its surrounding environment.

Thus, the foregoing configuration allows the operator to more accurately give new instructions or consider other options based on the graphically displayed operating status of each processing unit. The foregoing configuration is also advantageous for the administrators. Namely, it makes it easier for the administrators to perform daily management, such as replenishing of expendables such as paper or a developer, so as to prevent operations of each component of each processing unit from being arrested.

The electronically controlled apparatus preferably includes a selecting section, which selects one of the processing units, so as to cause the processing section to create graphic display of an operating status of the selected processing unit.

According to this configuration, the operating status of a processing unit, whose operating status needs to be confirmed, is graphically and selectively displayed among the plurality of processing units that are installed in the apparatus complex. This enables an operator to visually confirm a load on a selected processing unit and its surrounding environment. Thus, the foregoing configuration allows the operator to give new instructions or consider other options based on the graphically displayed operating status concerning the selected processing unit. The foregoing configuration is also advantageous for the administrators. Namely, it makes it easier for the administrators to perform daily management, such as replenishing of expendables such as paper or a developer, so as to prevent operations of each component of each processing unit from being arrested.

As described, yet another electronically controlled apparatus of the present invention is an electronically controlled apparatus with a plurality of processing modes for data processing, the processing modes being provided for an input-output section that electronically processes and outputs input data, the electronically controlled apparatus including: a managing section, which monitors operating status data of the processing modes, so as to store and manage the operating status data with corresponding time information of the operating status data; and a processing section, which creates (processes) graphic display of the operating status data in a given time scale for each processing mode according to the operating status data and the time information.

According to this configuration, the operating status of each of the processing modes of the apparatus complex is graphically displayed. This enables an operator to visually confirm a load on each processing mode and its surrounding environment, allowing the operator to give new instructions or consider other options based on the graphically displayed operating status of each processing mode. The foregoing configuration is also advantageous for the administrators. Namely, it makes it easier for the administrators to perform daily management, such as replenishing of expendables such as paper or a developer, so as to prevent operations of each component of each processing mode from being arrested.

The electronically controlled apparatus preferably includes a selecting section, which selects one of the processing modes, so as to cause the processing section to create (process) graphic display of an operating status of the selected processing mode.

According to this configuration, the operating status of a processing mode, whose operating status needs to be confirmed, is graphically displayed selectively among the plurality of processing modes that are installed in the apparatus complex. This enables an operator to visually confirm a load on the selected processing mode and its surrounding environment.

Thus, the foregoing configuration allows the operator to give new instructions or consider other options based on the graphically displayed operating status concerning the selected processing mode. The foregoing configuration is also advantageous for the administrators. Namely, it makes it easier for the administrators to perform daily management, such as replenishing of expendables such as paper or a developer, so as to prevent operations of each component of each processing mode from being arrested.

The electronically controlled apparatus preferably includes an overall status instructing section, which instructs the processing section to graphically display (process) an operating status of the electronically controlled apparatus as a whole, according to the operating status managed by the managing section.

According to this configuration, the operating status of the apparatus complex as a whole is graphically displayed. This enables an operator to visually confirm availability of the apparatus as a whole and its surrounding environment. Thus, the foregoing configuration allows the operator to confirm whether the apparatus is operating properly as a system (a set of components) and thereby enables the operator to consider other system options more reliably. The foregoing configuration is also advantageous for the administrators. Namely, it makes it easier for the administrators to perform daily management, such as replenishing of expendables such as paper or a developer, so as to prevent operations of the system from being arrested.

The electronically controlled apparatus preferably includes a communicating section, which sends and receives data that contain the operating status data.

According to this configuration, the provision of the communicating section allows the operator to confirm, for example via a network, the graphic display of the operating status of each component (processing mode, etc.) of the electrically controlled apparatus of a predetermined time period.

This enables the operator, for example, the administrator to confirm the operating status of each component of the electrically controlled apparatus via a network, without necessitating the administrator to go to the site of the apparatus.

The electronically controlled apparatus preferably includes a distinguishing section, which distinguishes an administrator from at least common users, the setting section setting the time scale according to the result of distinction between the administrator and at least common users.

According to this configuration, the operator is allowed to automatically switch a time period of graphic display. For example, the administrator can choose graphic display of a monthly operating status, whereas a common user can choose graphic display of a daily operating status. That is, switch to a desired display mode can be made more quickly.

The electronically controlled apparatus may further include a reservation section, which displays a reservation icon, so as to make a reservation for an inspection.

According to this configuration, the operator can make a reservation for a regular inspection to the reservation section, after confirming the graphic display of the operating status of each component of the electrically controlled apparatus of a predetermined time period. That is, the operator can schedule an inspection, which may be carried out on a regular basis, by making a reservation according to the operating condition of each component. This minimizes undesirable effects of an inspection, such as the inconvenient temporal arrest of the apparatus when the apparatus is busy, with respect to users of the electrically controlled apparatus.

The electronically controlled apparatus may further include a completion displaying section, which displays completion of the reservation for inspection.

According to this configuration, the operator can confirm completion of the inspection reservation on the graphic display. This is advantageous both for the administrator and common users because they can confirm completion of the inspection reservation and the presence of an inspection reservation (time of visit, time of arrest). That is, the apparatus can be used more conveniently by avoiding the reserved time of an inspection and allowing the inspection to be carried out without causing troubles.

The electronically controlled apparatus preferably includes: a display section, which displays the graphic display that was processed in the processing section; and a reservation instructing section, which makes a reservation for a new job for the each component according to the displayed graphic display.

According to this configuration, a job reservation is made after confirming the graphic display of the operating status of each component of a predetermined time period. This enables the job reservation to be made in reference to the past operating status (patterns), thereby enabling the operator to make a job reservation so as to process the reserved job more efficiently.

Further, by the provision of the setting section, any time period (month, day) can be set for the graphic display of the apparatus operating status. This enables the operator to confirm the operating status of the apparatus by narrowing down the time period successively. As a result, reservations can be made more accurately and the reserved job can be processed more efficiently.

The electronically controlled apparatus preferably includes a reservation mark displaying section, which displays, when there already exists a job reservation, the reserved job on the graphic display when the graphic display of the operating, status data of the each component, created by the processing section, is displayed.

According to this configuration, a reserved job, if any, is also displayed on the graphic display. This enables the operator to make a reservation by confirming the operating status of each component of the apparatus and the reservation status, thereby more accurately making reservations without overbooking with another job.

The electronically controlled apparatus preferably includes a reservation completion indicating section, which displays the new job reservation made by the reservation instructing section, the reservation being displayed on the graphic display of the operating status of the each component, created by the processing section.

According to this configuration, a reservation can be confirmed in the graphic display. This enables the operator to make reservations by confirming the operating status of the apparatus and confirm the reservations on the graphic display, thereby avoiding a reservation error.

The electronically controlled apparatus may further include an optimum level displaying section, which graphically displays an optimum processing level of the each component on the graphic display of the operating status data.

According to this configuration, an optimum level of the operating status of each component can be determined by confirming the operating status of each component of a predetermined time period and the optimum processing ability of each component on the graphic display. That is, the foregoing configuration enables the operator to confirm the operating status and optimum level of each component, thereby enabling the operator to consider new system options that are suitable for the user environment.

Further, by the provision of the setting section, any time period (month, day) can be set for the graphic display of the apparatus operating status. This enables the operator to confirm the patterns of the operating status, whether the operating status is exceeding its limits only temporarily or permanently.

Further, according to the foregoing configuration, by the provision of a plurality of processing modes such as different image processing modes, or a plurality of processing units, the operator can confirm the operating status and optimum level for each processing mode or processing unit. That is, the operator can confirm the operating status and optimum level of each apparatus component for each mode or each processing unit of the apparatus. This allows the operator to consider new system options according to the user environment.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An electronically controlled apparatus, comprising:
   an input-output section, which electronically processes and outputs input data;
   a control section, which electronically controls the input-output section according to activity rate data of each component of the input-output section;
   a managing section, which monitors the activity rate data of each component of the input-output section, so as to store and manage the activity rate data with corresponding time information of the activity rate data;
   a processing section, which creates a graphic display of the activity rate data in a given time scale according to the activity rate data and the time information;
   a display section, which displays the graphic display that was processed in the processing section; and
   a reservation instructing section, which makes a reservation for a new job for each component according to the displayed graphic display,
   wherein the reservation instruction section can display on the graphic display a plurality of previously entered jobs on the time scale indicating when the previously entered jobs are scheduled for as reserved icons, and wherein a reservation icon is initially displayed on the graphic display at a time location proximate the current time and the reservation icon may be moved by a user to another desired time location to reserve the new job if a previously reserved job already exists at the current time.

2. The electronically controlled apparatus as set forth in claim 1, further comprising:
   a reservation mark displaying section, which displays, when there already exists a job reservation, the reserved job on the graphic display when the graphic display of the activity rate data of the each component, created by the processing section, is displayed.

3. The electronically controlled apparatus as set forth in claim 1, further comprising:
   a reservation completion indicating section, which displays the new job reservation made by the reservation instructing section, the reservation being displayed on the graphic display of the activity rate of the each component, created by the processing section.

* * * * *